United States Patent
Daniels et al.

(10) Patent No.: US 11,192,908 B2
(45) Date of Patent: Dec. 7, 2021

(54) OCTAMOLYBDATE COMPOUNDS EXHIBITING BRIGHT EMISSION

(71) Applicants: Nanoco 2D Materials Limited, Manchester (GB); The University Of Manchester, Manchester (GB)

(72) Inventors: Steven Daniels, Manchester (GB); Nigel Pickett, Manchester (GB); Nicky Savjani, Manchester (GB); Virgil Gavriliuc, Manchester (GB)

(73) Assignee: Nanoco 2D Materials Limited, Manchester (GB)

( * ) Notice: Subject to any disclaimer, the term of this patent is extended or adjusted under 35 U.S.C. 154(b) by 0 days.

(21) Appl. No.: 16/542,727

(22) Filed: Aug. 16, 2019

(65) Prior Publication Data
US 2020/0055884 A1 Feb. 20, 2020

Related U.S. Application Data

(60) Provisional application No. 62/764,890, filed on Aug. 17, 2018.

(51) Int. Cl.
C07F 11/00 (2006.01)
C09K 11/06 (2006.01)

(52) U.S. Cl.
CPC ............ *C07F 11/005* (2013.01); *C09K 11/06* (2013.01); *C07B 2200/13* (2013.01); *C09K 2211/1029* (2013.01); *C09K 2211/183* (2013.01)

(58) Field of Classification Search
None
See application file for complete search history.

(56) References Cited

U.S. PATENT DOCUMENTS 8,057,561 B2   11/2011   White et al.

FOREIGN PATENT DOCUMENTS

CN   102658119 A   9/2012

OTHER PUBLICATIONS

Roman et al. "Preparation, structural, and spectroscopic study of tetrakis(4-methylpyridinium) β-octamolybdate" Journal of Crystallographic and Spectroscopic Research, 1987, vol. 17, No. 1, pp. 109-119.*

Campbell et al. (2014). Highly Luminescent and Color-Tunable Salicylate Ionic Liquids. Chem. Eur. J., 20, 4704-4712. doi:10.1002/chem.201301363.
Feghhi et al. (2019) Easy Scale-Up Synthesis of Mo8O26(C5H6N)4.H2O Hybrid with a Rectangular Prism Morphology and Its Application as an Efficient and Highly Recyclable Bi-functional Catalyst for Knoevenagel Condensations, ChemistrySelect, 4, 2551,2561, doi:10.1002/slct.201803124.
Guo et al. (2007) Tetrakis(1-n-hexylpyridinium) octamolybdate. Acta Cryst., E63, m1471. doi:10.1107/S1600536807019423.
Ito et al. (2013). Polyoxomolybdate-Surfactant Layered Crystals Derived from Long-tailed Alkylamine and Ionic Liquid. Chem. Lett., 42, 1400-1402. doi:10. 4 246/cl .130683.
Roman et al. (1986). Structure of 2-Methylpyridinium Octamolybdate (VI). Acta Cryst, C42, 956-958.
Ni, et al. (2009). Photooxygenation of hydrocarbons over efficient and reusable decatungstate heterogenized on hydrophobically-modified mesoporous silica. Chemical Communications, 2171-2173. doi:10.1039/b821987g.
Mccarron III et al. (1984). Pyridinium Molybdates. Synthesis and Structure of an Octamolybdate Containing Coordinately Bound Pyridine: [(C5H5NhMo8O16]4-. Inorganic Chemistry, 23(21), 3275-3280.
Liu et al. (2015).Norfloxacin-Derivative Functionalized Octamolybdate: Unusual Carbonyl Coordination and Acidity Sensitive Luminescence. RSC Advances, pp. 40688-40691., doi: 10.1039/c5ra04108b.
Szymańska et al. (2014) Preparation, structural characterization, and decomposition studies of two new γ-octamolybdates of 4-methylpyridine. Monatsh Chem 145, 921 929. https://doi.org/10.1007/s00706-014-1166-0.
Wei et al. (2014) Rigidifying Fluorescent Linkers by Metal-Organic Framework Formation for Fluorescence Blue Shift and Quantum Yield Enhancement. Journal of the American Chemical Society, 136, 23, 8269-8276 doi:https://doi.org/10.1021/ja5006866.
Ye et al. (2016) Alkylimidazolium/alkylpyridinium octamolybdates catalyzed oxidation of sulfides to sulfoxides/sulfones with hydrogen peroxide, Catalysis Communications, vol. 81, pp. 1-3, ISSN 1566-7367, https://doi.org/10.1016/j.catcom.2016.03.020.
Yu et al. (2013) Confinement of pyridinium hemicyanine dye within an anionic metal-organic framework for two-photon-pumped lasing. Nat Commun 4, 2719. https://doi.org/10.1038/ncomms3719.
Zhang et al. (2015). Ultra-high uptake and selective adsorption of organic dyes with a novel polyoxomolybdate-based organic-inorganic hybrid compound. RSC Advances, 5(57), 45688-45692. doi:10.1039/c5ra07513k.

* cited by examiner

*Primary Examiner* — Joseph R Kosack
(74) *Attorney, Agent, or Firm* — Blank Rome LLP

(57) ABSTRACT

Methods for the synthesis of a polyoxometalate compounds include heating a metal precursor in the presence of an organic salt. The polyoxometalate compounds produced herein display high photoluminescence quantum yields and photoluminescence maximums in the blue and/or violet regions of the electromagnetic spectrum.

18 Claims, 7 Drawing Sheets

OCTAMOLYBDATE COMPOUNDS EXHIBITING BRIGHT EMISSION

CROSS-REFERENCE TO RELATED APPLICATIONS

This application claims the benefit of U.S. Provisional Application No. 62,764,890 filed Aug. 17, 2018, the entire contents of which are incorporated herein by reference.

FEDERALLY SPONSORED RESEARCH OR DEVELOPMENT

Not Applicable

BACKGROUND OF THE INVENTION

1. Field of the Invention

The present invention relates to the synthesis and properties of polyoxometalate compounds. More particularly, the invention relates to the synthesis of polyoxometalate clusters exhibiting bright luminescence properties.

2. Description of the Related Art Including Information Disclosed Under 37 CFR 1.97 and 1.98

Polyoxometalates (POMs) are a class of anionic, molecular metal oxide clusters. POMs can be derivatized with organic groups to form POM "hybrids", and have been widely investigated for their catalytic, electronic and magnetic properties. Octamolybdates, which contain the anion $[Mo_8O_{26}]^{4-}$, are a subclass of POMs, which have so far been prepared in eight isomeric forms: $\alpha$, $\beta$, $\gamma$, $\delta$, $\varepsilon$, $\zeta$, $\eta$ and $\theta$, of which the $\alpha$ and $\beta$ isomers are the most prevalent. Reports of emission from octamolybdate clusters are scarce, with most of the reports incorporating a metal-containing group coordinated to the octamolybdate anion. In such compounds it has been proposed that photoluminescence may originate from metal-to-ligand or ligand-to-metal charge transfer between the additional metal (i.e. not Mo) and the organic ligands. Strongly-emitting POMs, for example octamolybdate compounds, could have numerous applications, for example, in sensing, biological imaging, and in optoelectronic devices.

BRIEF SUMMARY OF THE INVENTION

Herein, polyoxometalate compounds, including polyoxomolybdates, polyoxotungstates, polyoxochromates and polyoxovanadates, exhibiting bright luminescence properties are synthesized. Generally, polyoxometalate compounds made in accordance with various aspects of the present disclosure are crystalline materials that include polyoxometalate clusters, solvent molecules and at least the cationic portion of organic salts. The polyoxometalate compounds display a remarkably high (in some instances near unity) photoluminescence quantum yield (PLQY).

In some instances, polyoxometalate compounds may be prepared by stirring a molybdenum precursor at a temperature in the presence of an alkyl amine for a period of time. The addition of a chalcogen-containing compound during synthesis may assist in increasing the PLQY of polyoxometalate compounds. In some instances, polyoxometalate compounds may be extracted into water, yielding a water-soluble product. In some instances, polyoxometalate compounds may be treated with an aromatic amine, for example, pyridine, to render a solid material. In some instances, metal precursors or non-emissive polyoxometalate compounds can be reacted with an organic salt in the presence of a solvent to form a luminescent polyoxometalate compound.

In at least one embodiment, the PL maximum ($PL_{max}$) of polyoxometalate compounds, formed in accordance with various aspects of the present disclosure, is in the blue region of the electromagnetic spectrum. In some instances, the PLQY of the polyoxometalate compounds may be greater than 30%. In some instances, the PLQY of the polyoxometalate compounds may be greater than 40%. In some instances, the PLQY of the polyoxometalate compounds may be greater than 50%. In some instances, the PLQY of the polyoxometalate compounds may be greater than 60%. In some instances, the PLQY of the polyoxometalate compounds may be greater than 70%. In some instances, the PLQY of the polyoxometalate compounds may be greater than 80%. In some instances, the PLQY of the polyoxometalate compounds may be greater than 90%.

In some instances, polyoxometalate compounds according to the present disclosure may take the form $A_{4-x}B_{4-y}$[POM], wherein $x,y \leq 4$, $x+y=4$, and A is a protonated alkyl amine, B is a cationic portion of an organic salt such as, for example a pyridinium or imidazolium ion, and POM is a polyoxometalate cluster. In some instances, x and y each equal 2. In some instances, x equals 4 and y equals 0. In instances where polyoxometalate compounds according to the present disclosure include protonated alkyl amines (A groups), one or more of the hydrogens of the protonated alkyl amine may coordinate with oxygens of the polyoxometalate clusters via hydrogen bonding. In some instances, the size of the protonated alkyl amine (A groups) may affect the distance between adjacent polyoxometalate clusters. In some instances, where x equals 4, the cationic portion of an organic salt (B groups) may affect the distance between adjacent polyoxometalate clusters. In some instances, where the polyoxometalate compounds contain both A and B groups, the A and B groups may synergistically affect the distance between adjacent polyoxometalate clusters. In some instances, polyoxometalate cluster is a polyoxomolybdate cluster. In other instances, the polyoxometalate cluster is a polyoxotungstate cluster. In yet other instances, the polyoxometalate cluster is a polyoxochromate or polyoxovanadate cluster.

In at least one embodiment, the polyoxomolybdate cluster is a $[\beta-Mo_8O_{26}]^{4-}$ cluster. In at least one embodiment, the polyoxomolybdate compound is $(C(C_5H_{11})CH_2CH(CH_3)CH_2CH(CH_3)N(C_6H_{13}))_2(C_6H_{13}NH_3)_2[\beta-Mo_8O_{26}]$.

Due to the bright emission, polyoxometalate compounds produced in accordance with the present disclosure may find applications in, for example, optoelectronic devices, sensors, and biological imaging.

BRIEF DESCRIPTION OF THE SEVERAL VIEWS OF THE DRAWING(S)

DETAILED DESCRIPTION OF THE INVENTION

Figure 1:
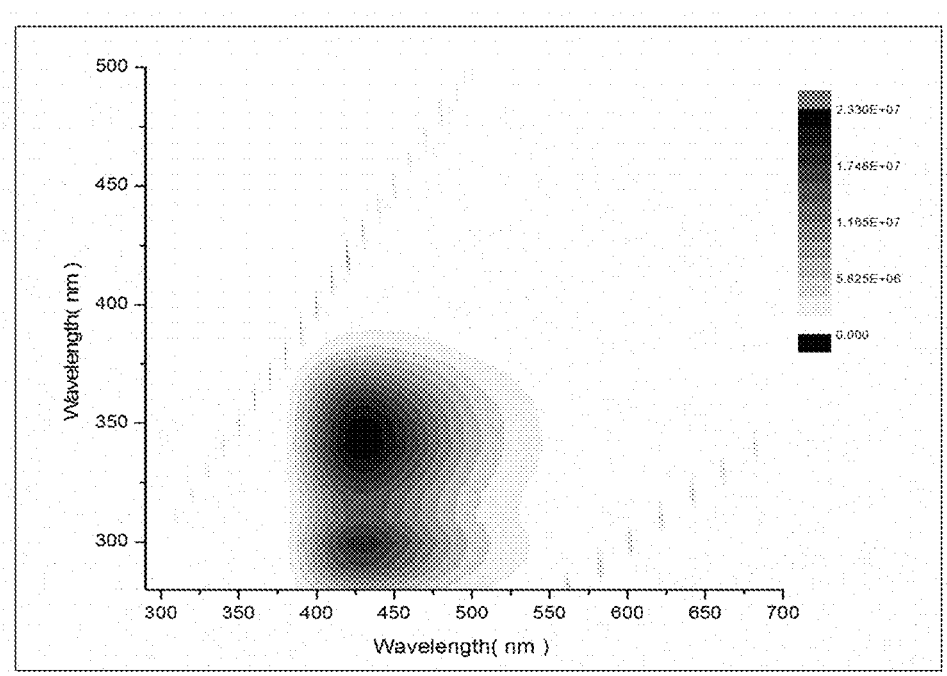
FIG. 1 is a PL contour map, which maps the PL emission (x-axis) against the excitation wavelength (y-axis), for a polyoxomolybdate compound extracted into water according to Example 1.

The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

Herein, polyoxometalate compounds, such as polyoxomolybdate and polyoxotungstate compounds, displaying bright photoluminescence properties are disclosed, and methods for their synthesis are described. The compounds display remarkably high (in some instances near unity) PLQYs, which, to the best of Applicant's knowledge, has not so far been reported in similar compounds in the prior art.

In some instances, polyoxomolybdate compounds may be prepared by stirring a molybdenum precursor at room or elevated temperatures in the presence of an alkyl amine for a period of time. The molybdenum precursor reagent can be any one of $MoO_3$, $Mo(CO)_6$, $H_2MoO_4$, $Li_2MoO_4$, $Na_2MoO_4$, $Na_2MoO_4 \cdot 2H_2O$, $K_2MoO_4$, $(NH_4)_2MoO_4$, $(NH_4)_6Mo_7O_{24} \cdot 4H_2O$, $ZnMoO_4$, $FeMoO_4$, $PbMoO_4$, and $Bi_2Mo_3O_{12}$. In some instances, the reaction is carried under acidic conditions. In some instances, acidic conditions are achieved using a strong acid such as HCl.

The alkyl amine may be a $C_3$-$C_{20}$ alkyl amine, or a combination of alkyl amines thereof. In at least one embodiment, the alkyl amine is propylamine. In at least one embodiment, the alkyl amine is hexylamine. In at least one embodiment, the alkyl amine is octylamine. In at least one embodiment, the alkyl amine is dodecylamine. In at least one embodiment, the alkyl amine is hexadecylamine. In at least one embodiment, the alkyl amine is octadecylamine. In some instances, the alkyl amine can be a secondary amine. In some instances, the $C_3$-$C_{20}$ alkyl amine can be a tertiary amine. In some instances, any one of an oxonium, sulfonium, sulfoxonium, or phosphonium compound can be use instead of the alkylamine.

The duration at which the molybdenum precursor is stirred in the presence of the alkyl amine depends on the temperature at which the molybdenum precursor and alkyl amine are stirred. For example, stirring the molybdenum precursor and the alkyl amine for a longer duration at a lower temperature may have the same effect as stirring at a higher temperature for a shorter duration. The stirring temperature and duration may influence the yield of the octamolybdate compound. The molybdenum precursor and alkyl amine may be stirred at a range of temperatures for a range of durations. For example, the molybdenum precursor and the alkyl amine may be stirred at a first temperature for a first duration, then subsequently stirred at a second temperature for a second duration. In one example, the molybdenum precursor and the alkyl amine are first stirred at a temperature of 250° C. for 2 hours, then subsequently stirred at room temperature for 6 weeks. In another example, the molybdenum precursor and the alkyl amine are stirred at a temperature of 45° C. for 24 hours. In general, the first temperature range can be from about 35° C. to about 300° C. and the time for the for stirring at the first temperature can range from about 30 minutes to about 48 hours. The second temperature can range from about room temperature to about 80° C. The second time duration can range from about 2 hours to about 12 weeks, alternatively from about 1 day to about 11 week, alternatively from about 3 days to about 10 weeks, alternatively from about 1 week to about 9 weeks, alternatively from about 2 weeks to about 8 weeks, and alternatively from about 4 weeks to about 8 weeks.

The molar ratio of the molybdenum precursor to the amine may be in the range of about 1:10 to about 1:1000, alternatively from about 1:20 to about 1:500, or more particularly about 1:50 to about 1:200.

Surprisingly, it has been found that the addition of a chalcogen-containing compound during synthesis may assist in increasing the PLQY of octamolybdate compounds. The chalcogen-containing compound may be sulphur-containing compound or a selenium-containing compound. The chalcogen-containing compound may be a thiol (R—S—H) such as an alkyl thiol or a selenol (R—Se—H) such as an alkyl selenol. For example, the chalcogen-containing compound can be a $C_3$-$C_{18}$ thiol. In some instances, the chalcogen-containing compound can more specifically be a $C_6$-$C_{12}$ thiol. In a particular example, the chalcogen-containing compound is 1-dodecanethiol. In other instances, the chalcogen-containing compound any one of 1-butanethiol, 1-decanethiol, 1-heptanethiol, 1-hexadecanethiol, 1-hexanethiol, 1-nonanethiol, 1-octadecanethiol, 1-octanethiol, 1-pentadecanethiol, 1-pentanethiol, 1-propanethiol, 1-tetradecanethiol, 1-undecanethiol, 2-ethylhexylthiol, 2-methyl-1-propanethiol, 2-methyl-2-propanethiol, 3-methyl-1-butanethiol, tert-dodecylmercaptan, tert-nonylmercaptan, 1,1',4',1"-benzenedim ethanethiol, 1-adamantanethiol, 1-naphthalenethiol, 2-phenylethanethiol, 9-fluorenylmethylthiol, 9-mercaptofluorene, biphenyl-4-thiol, cyclohexanethiol, cyclopentanethiol, or thiophenol. In other instances, the chalcogen-containing compound any one of benzene selenol, octane selenol, dodecane selenol, phenylmethane selenol, 2-methylbenzene selenol, 3-methylbenzene selenol, 4-methylbenzene selenol, 2-methylpropane-2-selenol, methane selenol, ethane selenol, and propane-2-selenol.

In some instances, the chalcogen-containing compound can be a phenyl sulphide or a phenyl selenide. In some instances, the phenyl sulphide is diphenyl disulphide. In other instances, the phenyl sulphide can be any one of diphenyl sulphide, methyl ρ-tolylsuphide, ethyl phenyl sulphide, chloromethyl phenyl sulphide, 2-chloroethyl phenyl sulphide, 1,2-benzodiphenylene sulphide, cyclopropyl phenyl sulfide, phenyl vinyl sulphide, allyl phenyl sulphide, methoxymethyl phenyl sulphide, benzyl phenyl sulphide, methyl phenyl sulphide, dibenzothiophene, 9-anthracenylmethyl ρ-tolyl sulphide, 9-anthracenylmethyl hexyl sulphide, 9-anthracenylmethyl methyl sulphide, 9-anthracenylmethyl phenyl sulphide, allyl ρ-tolyl sulphide, propyl ρ-tolyl sulphide, ethyl ρ-tolyl sulphide, butyl ρ-tolyl sulphide, isoamyl ρ-tolyl sulphide, phenyl ρ-tolyl sulphide, 1,3-butadien-2-yl phenyl sulphide, 2-methylallyl phenyl sulphide, 2-methylallyl o-tolyl sulphide, 4-biphenylyl phenyl sulphide, 4-methylbenzyl phenyl sulphide, 4-tert-butylphenyl methyl sulphide, α,α-dimethylbenzyl phenyl sulphide, crotyl o-tolyl sulphide, crotyl phenyl sulphide, phenethyl phenyl sulphide, phenyl 1-phenylpropyl sulphide, phenyl 3-phenylpropyl sulphide, phenyl styryl sulphide, styryl o-tolyl sulphide, styryl m-tolyl sulphide, 2-norbornyl ρ-tolyl sulphide, or phenyl tetradecyl sulphide. In some instances, the phenyl selenide is diphenyl diselenide. In other instances, the phenyl selenide can be any one of diphenyl selenide, ρ-tolyl selenide, methyl phenyl selenide, phenyl tert-butyl selenide, and allyl phenyl selenide.

In some instances, the chalcogen-containing compound may be an alkyl sulphide or an alkyl selenide. In some instances, the alkyl sulphide is dodecyl sulphide. In other instances, the alkyl sulphide can be any one of dodecyl methyl sulphide, butyl dodecyl sulphide, tert-dodecyl sulphide, benzyl methyl sulphide, butyl sulphide, propylene sulfide, diethyl sulphide, dibutyl sulphide, allyl sulphide, dibenzyl sulphide, dioctyl sulphide, isopropyl sulphide, sec-butyl sulphide, ethyl vinyl sulphide, dodecyl methyl sulphide, ethyl methyl sulphide, allyl methyl sulphide, dimethyl sulphide, tetrahydrothiophene, 2,2'-thiodiethanethiol, 1-phenylethyl sulphide, 2-ethylhexyl sulphide, allyl sec-butyl sulphide, butyl sec-butyl sulphide, butyl tert-butyl sulphide, heptyl sulphide, hexadecyl sulphide, isopentyl sulphide, methallyl sulphide, nonyl sulphide, methyl tert-octyl sulphide, octadecyl sulphide, tetradecyl sulphide, undecyl sulphide, allyl ethyl sulphide, allyl propyl sulphide, amyl methyl sulphide, benzyl cyclohexyl sulphide, butyl dodecyl sulphide, butyl isobutyl sulphide, butyl isopropyl sulphide, butyl methyl sulphide, butyl propyl sulphide, decyl ethyl sulphide, decyl methyl sulphide, ethyl nonyl sulphide, ethyl octyl sulphide, heptyl methyl sulphide, isoamyl methyl sulphide, isobutyl isopropyl sulphide, isobutyl propyl sulphide, methyl 2-methylallyl sulphide, methyl 2-naphthylmethyl sulphide, sec-butyl propyl sulphide, or tert-butyl isopropyl sulphide. Suitable alkyl selenides include, but are not limited to, dimethyl selenide, diethyl selenide, di-tert-butyl selenide, benzyl selenide, di-n-decyl selenide, and dimethyl diselenide.

In some instances, polyoxometalate compounds produced in methods of the present disclosure may be extracted into water, yielding water-soluble products.

For certain applications, it may be desirable to have a solid product for ease of handling. In some instances, polyoxometalate compounds produced in accordance with various aspects of the present disclosure can be treated with an aromatic amine to render a solid material. In some instances, the aromatic amine is pyridine or a derivative thereof. In other instances, the aromatic amine can be any one of aniline, a phenylenediamine, a toluidine, a diaminotoluene, a naphthylamine, an aminopyridine, quinoline, an aminoquinoline, purine, an aminopurine, pyrimidine, an aminopyrimidine, pyrazine, pyridazine, indole, acridine, an aminoacridine, pyrrole, or any suitable derivatives thereof.

In some instances, polyoxometalate compounds according to the present disclosure may take the form $A_{4-x}B_{4-y}$[POM], wherein x,y≤4, x+y=4, and A is a protonated alkyl amine, B is a cationic portion of an organic salt such as, for example a pyridinium or imidazolium ion, and POM is a polyoxometalate cluster. In some instances, x and y each equal 2. In some instances, x equals 4 and y equals 0. In instances where polyoxometalate compounds according to the present disclosure include protonated alkyl amines (A groups), one or more of the hydrogens of the protonated alkyl amine may coordinate with oxygens of the polyoxometalate clusters via hydrogen bonding. In some instances, the size of the protonated alkyl amine (A groups) may affect the distance between adjacent polyoxometalate clusters. In some instances, where x equals 4, the cationic portion of an organic salt (B groups) may affect the distance between adjacent polyoxometalate clusters. In some instances, where the polyoxometalate compounds contain both A and B groups, the A and B groups may synergistically affect the distance between adjacent polyoxometalate clusters. In some instances, polyoxometalate cluster is a polyoxomolybdate cluster. In other instances, the polyoxometalate cluster is a polyoxotungstate cluster. In yet other instances, the polyoxometalate cluster is a polyoxochromate or polyoxovanadate cluster.

In at least one embodiment, polyoxomolybdate cluster is a $[\beta\text{-Mo}_8O_{26}]^{4-}$ cluster. In at least one embodiment, the polyoxomolybdate compound comprises two 1-hexyl, 2-pentyl, 4-,6-dimethyl pyridinium ligands and two hexylammonium ligands. In at least one embodiment, the polyoxomolybdate compound is $(C(C_5H_{11})CH_2CH(CH_3)CH_2CH(CH_3)N(C_6H_{13}))_2(C_6H_{13}NH_3)_2[\beta\text{-Mo}_8O_{26}]$.

In some instances, non-emissive polyoxomolybdate compounds may be prepared by first stirring a molybdenum precursor at a temperature in the presence of a Lewis base, such as an alkyl amine, for a period of time to form the non-emissive polyoxomolybdate compound. The molybdenum precursor reagent can be any one of $MoO_3$, $Mo(CO)_6$, $H_2MoO_4$, $Li_2MoO_4$, $Na_2MoO_4$, $Na_2MoO_4\cdot2H_2O$, $K_2MoO_4$, $(NH_4)_2MoO_4$, $(NH_4)_6Mo_7O_{24}\cdot4H_2O$, $ZnMoO_4$, $FeMoO_4$, $PbMoO_4$, and $Bi_2Mo_3O_{12}$. The alkyl amine may be a $C_3$-$C_{20}$ alkyl amine, or a combination of alkyl amines thereof. In at least one embodiment, the alkyl amine is propylamine. In at least one embodiment, the alkyl amine is hexylamine. In at least one embodiment, the alkyl amine is octylamine. In at least one embodiment, the alkyl amine is dodecylamine. In at least one embodiment, the alkyl amine is hexadecylamine. In at least one embodiment, the alkyl amine is octadecylamine. In some instances, the alkyl amine can be a secondary amine. In some instances, the $C_3$-$C_{20}$ alkyl amine can be a tertiary amine. In some instances, the alkyl amine can contain one or more carbon-carbon double or triple bonds such as, for example, 2-propen-1-amine, 3-buten-1-amine, 2-methyl-3-butyn-2-amine, and butyl-but-2-ynyl-amine. In some instances, the alkyl amine can contain an aromatic, cyclic or heterocyclic ring. In some instances, any one of an oxonium, sulfonium, sulfoxonium, or phosphonium compound can be use instead of the alkylamine.

An exemplary reaction for the formation of a non-emissive polyoxomolybdate compound is shown in scheme (1) as follows:

(1)

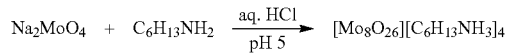

Generally, reaction scheme (1) is carried under acidic conditions using a strong acid such as HCl. The non-emissive polyoxomolybdate compound can then be reacted with an organic salt to form an emissive polyoxomolybdate compound. An exemplary reaction for the formation of an emissive polyoxomolybdate compound is shown in scheme (2) as follows:

(2)

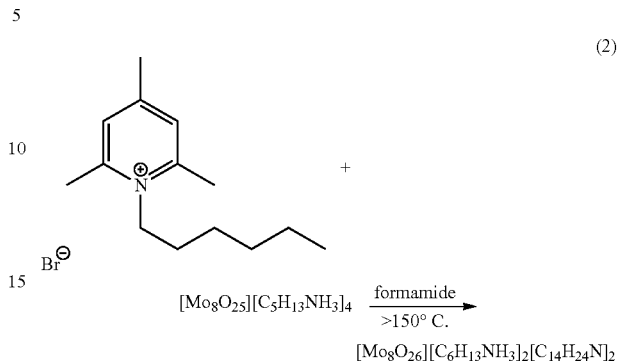

In some instances, emissive polyoxomolybdate compound may be directly reacting a molybdenum precursor with an organic salt. An exemplary reaction for the formation of an emissive polyoxomolybdate compound by a direct reaction is shown in scheme (3) as follows:

(3)

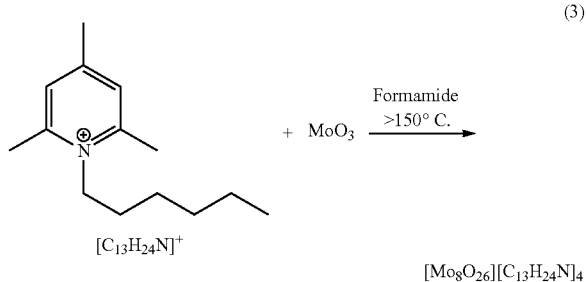

In some instances, reaction scheme (3) can be modified by adding a small amount of an alkylamine co-solvent such as for example butylamine, propylamine, or propylamine, as shown in reaction scheme (4):

(4)

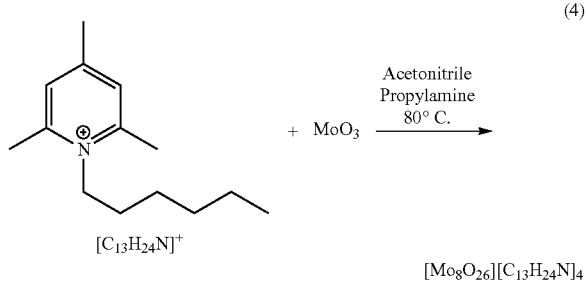

In some instances, a solvent system having about 1 to about 15 vol %, alternatively about 2.5 to about 12.5 vol %, and alternatively about 5 to about 10 vol % of the alkylamine co-solvent (relative to the primary solvent) can be used. In some instances, use of an alkylamine co-solvent may allow for the reaction to proceed at lower temperatures and allow for easier product purification.

In reaction schemes (2)-(3), formamide is used as the solvent and the reaction temperature is greater than 150° C. In reaction scheme (4) acetonitrile is used as the main solvent and the reaction temperature is about 80° C. Solvents suitable for use reaction schemes (2)-(5) include formamide, acetonitrile (and longer alkyl chain nitriles), methanol, ethanol, isopropanol, n-propanol, n-butanol (and longer straight and branched chain alcohols), terpineol, valeric acid, 1,4-butanediol, ethylene glycol, propylene glycol, diethylene glycol (including ethers and esters thereof), dipropylene glycol (including ethers and esters thereof), diglyme, triglyme, glycerol (including ethers and esters of), triacetin, n-methylformamide, dimethylformamide, acetamide, n-methylacetamide, dimethylacetamide, n-methylpyrrolidine, ethylene carbonate, propylene carbonate. In general, the solvent should be polar with the possibility of hydrogen bonding.

The molar ratio of the molybdenum precursor to the organic salt in reaction schemes (2)-(4) may be in the range of about 100:1 to about 1:100, alternatively from about 20:1 to about 1:20, and alternatively from about 1:5 to about 5:1.

The reaction temperature for schemes (2)-(4) may be in the range of about 20 and about 250° C., alternatively between about 60 and about 250° C. alternatively between about 60 and about 150° C., and alternatively between about 80 and about 150° C. In some instances, the reaction time may be in the range of about 1 minute to about 30 days. In some instances, the reaction time from about 1 h to about 7 days. In some instances, the reaction time can be from about 1 h to about 3 days. The reaction temperature and time may in part be predicated upon the boiling point, polarity and/or hydrogen-bonding ability of the solvent to be used.

In some instances, the organic salt of reaction schemes (2)-(4) can be a pyridinium salt. Exemplary pyridinium salts include those having a structure according to compounds I-XII as follows:

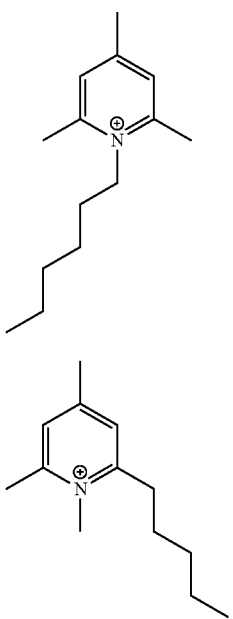

I

II

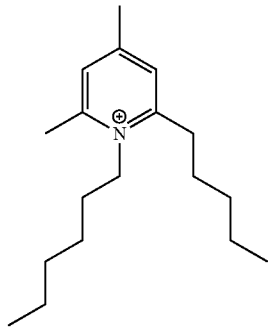

III

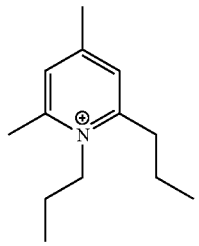

IV

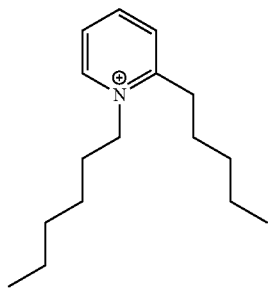

V

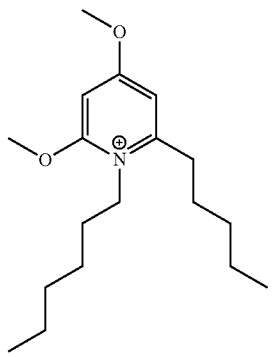

VI

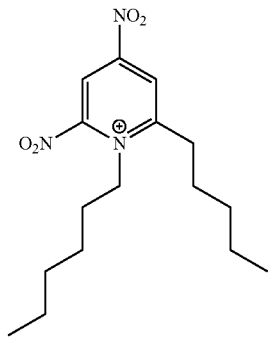

VII

-continued

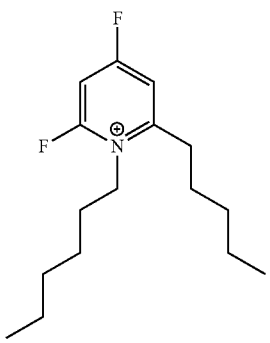
VIII

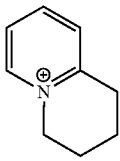
IX

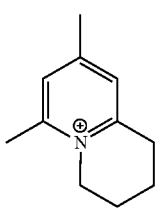
X

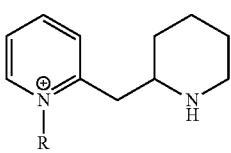
XI

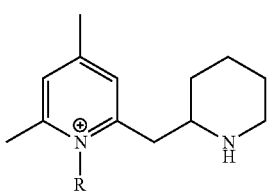
XII

Generally, but not exclusively, a suitable pyridinium salt can be defined as having the structure:

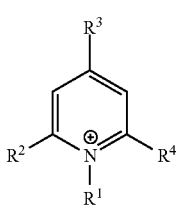
XIII wherein:

R¹ is a substituted or unsubstituted, linear or branched, saturated or at least partially unsaturated alkyl group (for example, methyl, ethyl, propyl, butyl, pentyl, hexyl, heptyl, octyl, nonyl, decyl, isobutyl, sec-butyl, tert-butyl, isopentyl, methyl ethyl ether, methyl hexyl ether, 3-methylpentane, 2-heptene, 1-octene, and 1-pentene); and $R^2$-$R^4$ are each the same or different H, alkyl, alkoxy, nitro, nitrile, halogen, acyl or thiol groups (for example, methyl, ethyl, propyl, butyl, pentyl, hexyl, heptyl, octyl, nonyl, decyl, isobutyl, sec-butyl, tert-butyl, isopentyl, methyl ethyl ether, methyl hexyl ether, 3-methylpentane, 2-heptene, 1-octene, and 1-pentene, methoxy, ethoxy, pentoxy, phenoxy, 2-methylpiperidine, 3-methylpiperidine, 4-ethylmorpholine, 2-propene-1-thiol, piperidine-4-thiol, tetrahydro-2H-pyran-4-thiol, 1-octanethiol, 1-dodecanethiol, chlorine, fluorine, bromine, iodine, acetyl, nitrovinyl).

In some instances, the organic salt of reaction schemes (2)-(4) can be a quinolinium salt. Exemplary quinolinium salts include those having a structure according to compounds XIV-XXII as follows:

XIV

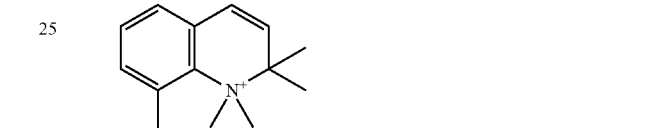
XV

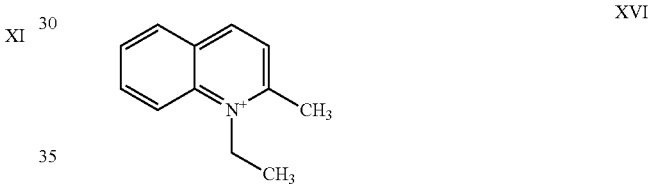
XVI

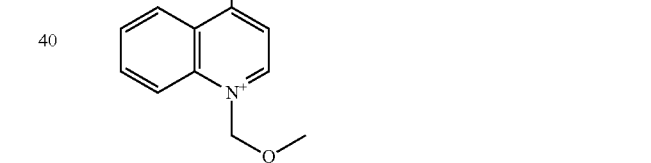
XVII

XVIII

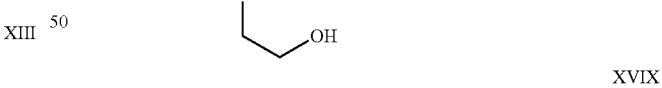
XVIX

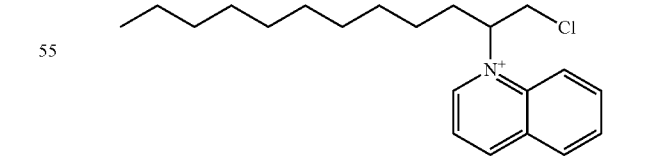

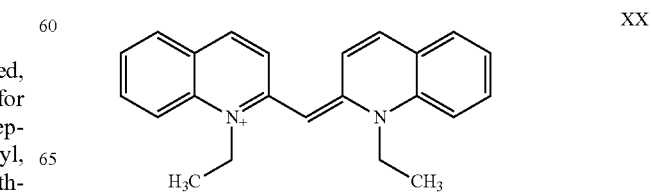
XX

-continued

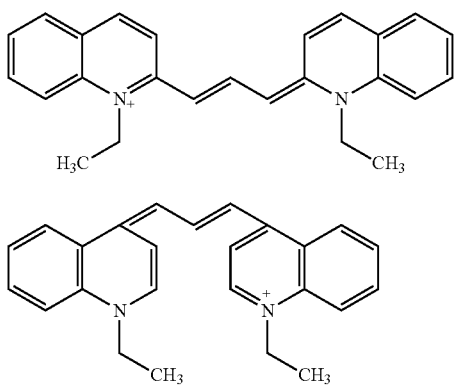

XXI

XXII

Generally, but not exclusively, a suitable quinolinium salt can be defined as having the structure:

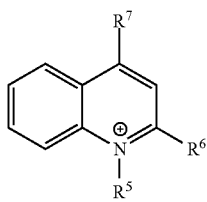

XXIII wherein:

R⁵ is a substituted or unsubstituted, linear or branched, saturated or at least partially unsaturated alkyl group (for example, methyl, ethyl, propyl, butyl, pentyl, hexyl, heptyl, octyl, nonyl, decyl, isobutyl, sec-butyl, tert-butyl, isopentyl, methyl ethyl ether, methyl hexyl ether, 3-methylpentane, 2-heptene, 1-octene, and 1-pentene); and R⁶ and R⁷ are each the same or different H, alkyl, alkoxy nitro, nitrile, halogen, acyl or thiol groups (for example, methyl, ethyl, propyl, butyl, pentyl, hexyl, heptyl, octyl, nonyl, decyl, isobutyl, sec-butyl, isopentyl, methyl ethyl ether, methyl hexyl ether, 3-methylpentane, 2-heptene, 1-octene, and 1-pentene, methoxy, ethoxy, pentoxy, phenoxy, 2-methylpiperidine, 3-methylpiperidine, 4-ethylmorpholine, 2-propene-1-thiol, piperidine-4-thiol, tetrahydro-2H-pyran-4-thiol, 1-octanethiol, 1-dodecanethiol, chlorine, fluorine, bromine, iodine, acetyl, nitrovinyl).

In some instances, the organic salt of reaction schemes (2)-(4) can be an isoquinolinium salt. Exemplary isoquinolinium salts include those having a structure according to compounds XXIV-XXIX as follows:

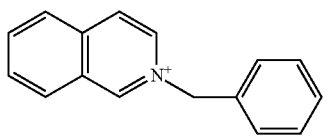

XXIV

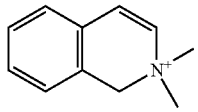

XXV

-continued

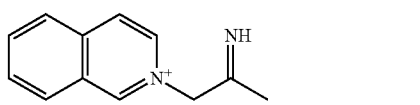

XXVI

XXVII

XXVIII

XXIX

Generally, but not exclusively, a suitable isoquinolinium salt can be defined as having the structure:

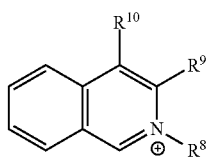

XXX wherein:

R⁸ is a substituted or unsubstituted, linear or branched, saturated or at least partially unsaturated alkyl group (for example, methyl, ethyl, propyl, butyl, pentyl, hexyl, heptyl, octyl, nonyl, decyl, isobutyl, sec-butyl, tert-butyl, isopentyl, methyl ethyl ether, methyl hexyl ether, 3-methylpentane, 2-heptene, 1-octene, and 1-pentene); and R⁹ and R¹⁹ are each the same or different H, alkyl, alkoxy nitro, nitrile, halogen, acyl or thiol groups (for example, methyl, ethyl, propyl, butyl, pentyl, hexyl, heptyl, octyl, nonyl, decyl, isobutyl, sec-butyl, tert-butyl, isopentyl, methyl ethyl ether, methyl hexyl ether, 3-methylpentane, 2-heptene, 1-octene, and 1-pentene, methoxy, ethoxy, pentoxy, phenoxy, 2-methylpiperidine, 3-methylpiperidine, 4-ethylmorpholine, 2-propene-1-thiol, piperidine-4-thiol, tetrahydro-2H-pyran-4-thiol, 1-octanethiol, 1-dodecanethiol, chlorine, fluorine, bromine, iodine, acetyl, nitrovinyl).

In some instances, the organic salt of reaction schemes (2)-(4) can be a pyrazinium salt. Exemplary pyrazinium salts include those having a structure according to compounds XXXI-XXXV as follows:

XXXI
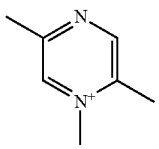

XXXII
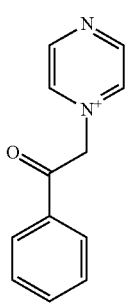

XXXIII
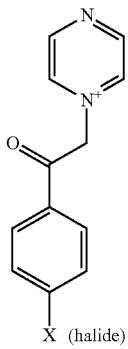

XXXIV
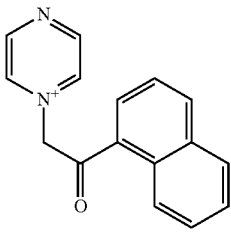

XXXV
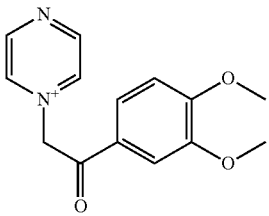

Generally, but not exclusively, a suitable pyrazinium salt can be defined as having the structure:

XXXVI
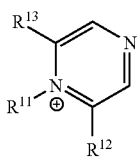

wherein:
R[11] is a substituted or unsubstituted, linear or branched, saturated or at least partially unsaturated alkyl group (for example, methyl, ethyl, propyl, butyl, pentyl, hexyl, heptyl, octyl, nonyl, decyl, isobutyl, sec-butyl, tert-butyl, isopentyl, methyl ethyl ether, methyl hexyl ether, 3-methylpentane, 2-heptene, 1-octene, and 1-pentene); and R[12] and R[13] are each the same or different H, alkyl, alkoxy, nitro, nitrile, halogen, acyl or thiol groups (for example, methyl, ethyl, propyl, butyl, pentyl, hexyl, heptyl, octyl, nonyl, decyl, isobutyl, sec-butyl, tert-butyl, isopentyl, methyl ethyl ether, methyl hexyl ether, 3-methylpentane, 2-heptene, 1-octene, and 1-pentene, methoxy, ethoxy, pentoxy, phenoxy, 2-methylpiperidine, 3-methylpiperidine, 4-ethylmorpholine, 2-propene-1-thiol, piperidine-4-thiol, tetrahydro-2H-pyran-4-thiol, 1-octanethiol, 1-dodecanethiol, chlorine, fluorine, bromine, iodine, acetyl, nitrovinyl).

In some instances, the organic salt of reaction schemes (2)-(4) can be a pyrimidinium salt. Exemplary pyrimidinium salts include those having a structure according to compounds XXXVII-XLII as follows:

XXXVII
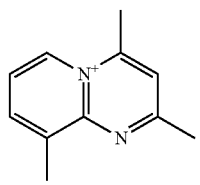

XXXVIII
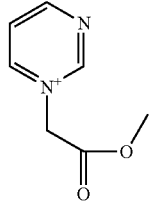

XXXIX
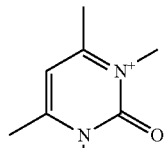

XL
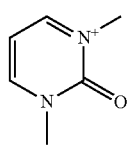

XLI
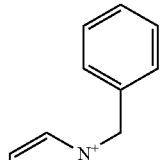

XLII
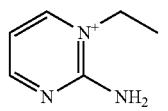

Generally, but not exclusively, a suitable pyrimidinium salt can be defined as having the structure:

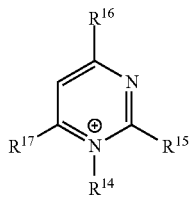

XLIII wherein:

$R^{14}$ is a substituted or unsubstituted, linear or branched, saturated or at least partially unsaturated alkyl group (for example, methyl, ethyl, propyl, butyl, pentyl, hexyl, heptyl, octyl, nonyl, decyl, isobutyl, sec-butyl, tert-butyl, isopentyl, methyl ethyl ether, methyl hexyl ether, 3-methylpentane, 2-heptene, 1-octene, and 1-pentene); and $R^{15}$-$R^{17}$ are each the same or different H, alkyl, alkoxy, nitro, nitrile, halogen, acyl or thiol groups (for example, methyl, ethyl, propyl, butyl, pentyl, hexyl, heptyl, octyl, nonyl, decyl, isobutyl, sec-butyl, tert-butyl, isopentyl, methyl ethyl ether, methyl hexyl ether, 3-methylpentane, 2-heptene, 1-octene, and 1-pentene, methoxy, ethoxy, pentoxy, phenoxy, 2-methylpiperidine, 3-methylpiperidine, 4-ethylmorpholine, 2-propene-1-thiol, piperidine-4-thiol, tetrahydro-2H-pyran-4-thiol, 1-octanethiol, 1-dodecanethiol, chlorine, fluorine, bromine, iodine, acetyl, nitrovinyl).

In some instances, the organic salt of reaction schemes (2)-(4) can be an indolium salt. Exemplary indolium salts include those having a structure according to compounds XLIV-XLVI as follows:

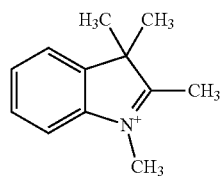

XLIV

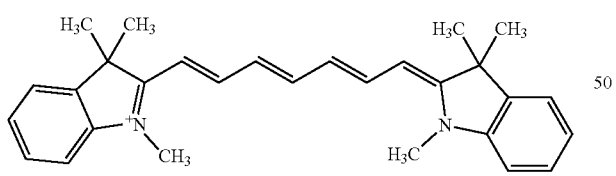

XLV

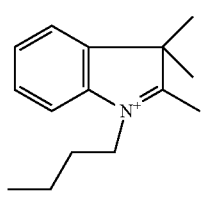

XLVI

In some instances, the organic salt of reaction schemes (2)-(4) can be an imidazolium salt. Exemplary imidazolium salts include those having a structure according to compounds XLVII-LV as follows:

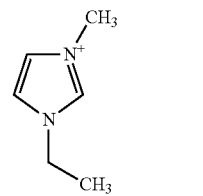

XLVII

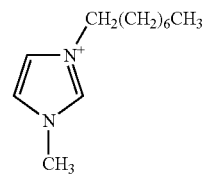

XLVIII

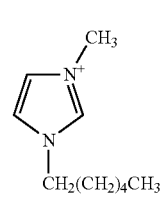

XLIX

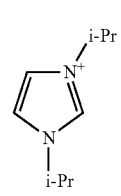

L

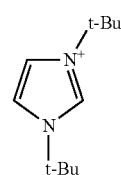

LI

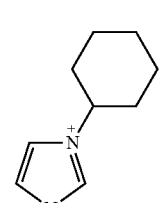

LII

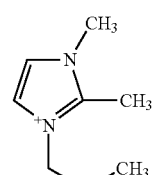

LII

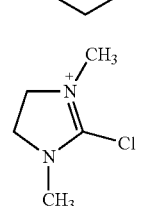

LIII

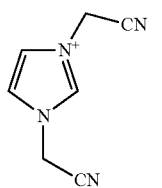   LIV

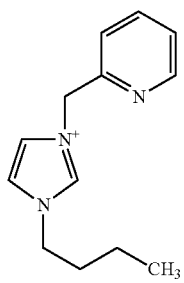   LV

In some instances, the organic salt can be a benzoxazolium salt. Exemplary benzoxazolium salts include those having a structure according to compounds LVI-LVIII as follows:

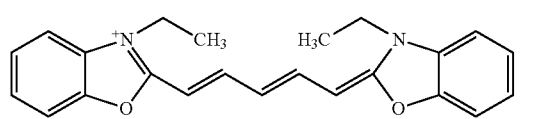   LVI

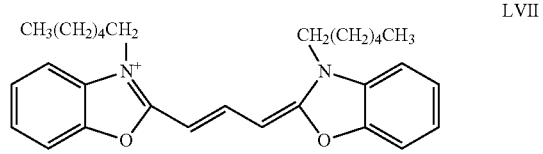   LVII

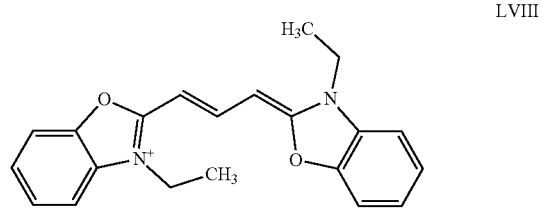   LVIII

In some instances, the organic salt of reaction schemes (2)-(4) can be a benzimidazolium salt. Exemplary benzimidazolium salts include those having a structure according to compounds LVIX-LXIV as follows:

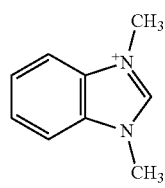   LVIX

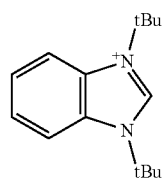   LX

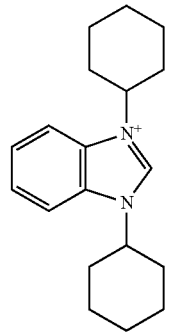   LXI

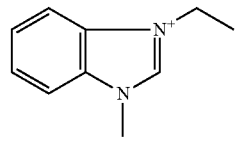   LXII

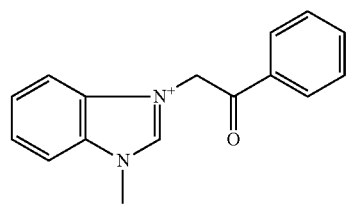   LXIII

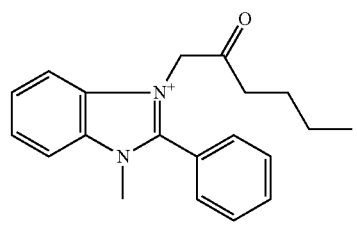   LXIV

In some instances, the organic salt of reaction schemes (2)-(4) can be a thiazolium salt. Exemplary thiazolium salts include those having a structure according to compounds LXV-LXXI as follows:

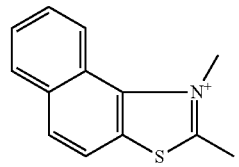   LXV

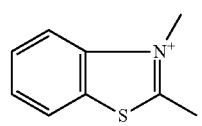   LXVI

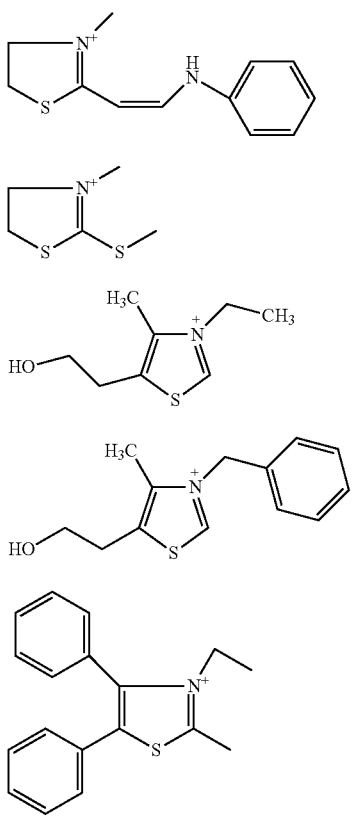

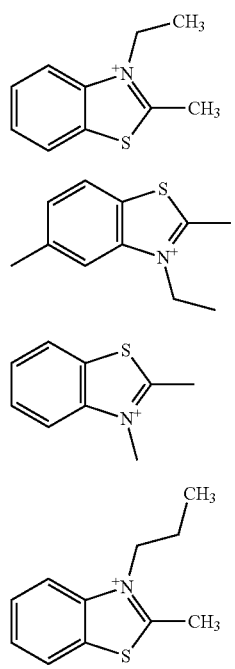

In some instances, the organic salt of reaction schemes (2)-(4) can be a benzothiazolium salt. Exemplary benzothiazolium salts include those having a structure according to compounds LXXII-LXXVIII as follows:

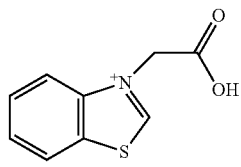

LXVII

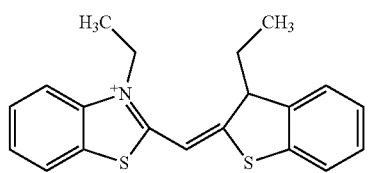

LXVIII

LXIX

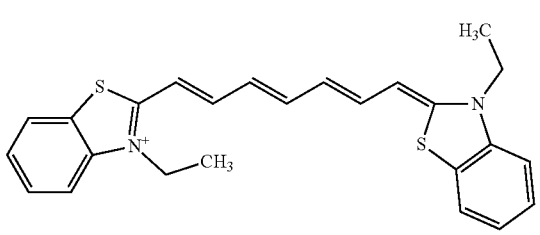

LXX

LXXI

LXXVI

LXXVII

LXXVIII

In some instances, the organic salt of reaction schemes (2)-(4) can be a pyrylium or thiopyrylium salt. Exemplary pyrylium or thiopyrylium salts include those having a structure according to compounds LXXII-LXXVIII as follows:

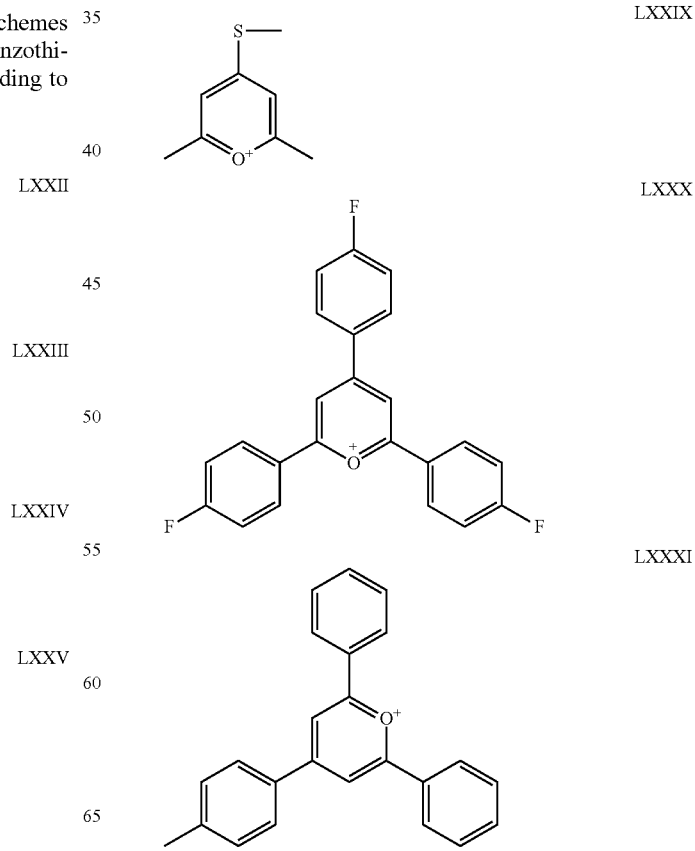

LXXIX

LXXX

LXXXI

-continued

LXXXII

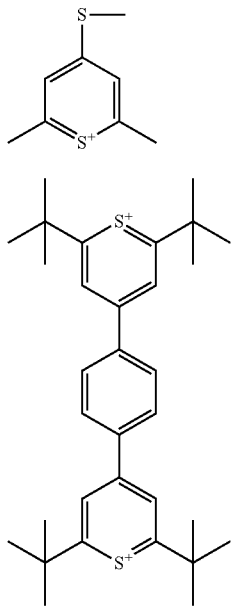

LXXXIII

In each of compounds I-LXXXIII above, the counter anion can be any suitable anion such as, but not limited to, $F^-$, $Cl^-$, $Br^-$, $I^-$, $NO_3^-$, $NO_2^-$, $HSO_4^-$, $ClO_4^-$, $ClO_3^-$, $OCl^-$, $OBr^-$, $CH_3SO_3^-$, $CF_3SO_3^-$, $CH_3C_6H_4SO_3^-$, $BF_4^-$, $PF_6^-$, $SbF_6^-$, and $CH_3COO^-$. Organic salts described herein may be commercially available from suppliers such as Sigma Aldrich, Fisher Scientific, Strem, VWR, and Acros Organics.

Methods disclosed herein, such as those of reaction schemes (1)-(4) above and the examples below, may be modified to synthesize other POMs, such as polyoxotungstates, polyoxochromates and polyoxovanadates, and to synthesize clusters of other sizes of $Mo_xO_y$ units. Examples of suitable tungsten precursors may include, but are not restricted to: $W(CO)_6$, $WO_3$, $CaWO_4$, $Li_2WO_4$, $Na_2WO_4\cdot 2H_2O$, $3Na_2WO_4\cdot 9WO_3$, $K_2WO_4$, $BaWO_4$, $CdWO_4$, $MgWO_4$, $(NH_4)_6H_2W_{12}O_{40}\cdot xH_2O$, $(NH_4)_{10}H_2(W_2O_7)_6$, and $H_2WO_4$. Examples of suitable chromium precursors may include, but are not restricted to: $Cr(CO)_6$, $CrO_3$, $K_2CrO_4$, $Na_2CrO_4$, $Na_2CrO_4\cdot 4H_2O$, $BaCrO_4$, $Ag_2CrO_4$, $CaCrO_4$, $(NH_4)_2CrO_4$, $PbCrO_4$, $Rb_2CrO_4$, $[(C_6H_5)_3SiO]_2CrO_2$, $K_3Cr(C_2O_4)_3\cdot 3H_2O$, and $CrO_2Cl_2$. Examples of suitable vanadium precursors may include, but are not restricted to: $NaVO_3$, $(Ph_3SiO)_3VO_3$, $NH_4VO_3$, $AgVO_3$, $V_2O_5$, $V_2O_4$, and $V_2O_3$. Examples of $Mo_xO_y$ units include, but are not limited to, units wherein x=1 and y=4, x=2 and y=7, x=3 and y=10, x=4 and y=13, x=5 and y=16, x=6 and y=19, x=7 and y=24, x=12 and y=40, x=16 and y=52, and x=18 and y=54.

In at least one embodiment, the PL maximum ($PL_{max}$) of polyoxometalate compounds produced in accordance with various aspects of the present disclosure is in the blue region of the electromagnetic spectrum. In at least one embodiment, the $PL_{max}$ of polyoxometalate compounds produced in accordance with various aspects of the present disclosure is in the violet region of the electromagnetic spectrum. In at least one embodiment, the $PL_{max}$ of polyoxometalate compounds produced in accordance with various aspects of the present disclosure spans the blue and violet regions of the electromagnetic spectrum. In some instances, the PLQY of a polyoxometalate compound produced in accordance with various aspects of the present disclosure may be greater than 30%. In some instances, the PLQY a polyoxometalate compound produced in accordance with various aspects of the present disclosure may be greater than 40%. In some instances, the PLQY of a polyoxometalate compound produced in accordance with various aspects of the present disclosure may be greater than 50%. In some instances, the PLQY of a polyoxometalate compound produced in accordance with various aspects of the present disclosure may be greater than 60%. In some instances, the PLQY of a polyoxometalate compound produced in accordance with various aspects of the present disclosure may be greater than 70%. In some instances, the PLQY of a polyoxometalate compound produced in accordance with various aspects of the present disclosure may be greater than 80%. In some instances, the PLQY of a polyoxometalate compound produced in accordance with various aspects of the present disclosure may be greater than 90%.

POMs have been proposed for a range of applications, including catalysis, gas-sorption, magnetism, electrical conductivity, and photochemistry. In addition, octamolybdate compounds or other POMs formed using methods in accordance with the present disclosure may find applications in, for example, optoelectronic devices, sensors, and biological imaging.

EXAMPLES

The following non-limiting examples are provided for illustrative purposes only in order to facilitate a more complete understanding of representative embodiments now contemplated. These examples should not be construed to limit any of the embodiments described in the present specification.

Example 1: Synthesis of 435 nm-Emitting [$Mo_8O_{26}$] Polyoxomolybdate Compound In a 1 L flask, 50 mL of hexadecane and 5 g hexadecylamine were heated under vacuum at 80° C. for 1 hour to form solution A. In a 200 mL vial, 10 g hexadecylamine and 50 mL hexadecane were also degassed at 80° C. to form solution B. In a 250 mL round-bottomed flask, solution B was added to 1.32 g $Mo(CO)_6$, and stirred at 120° C. to form solution C. Solution A was heated to 250° C., at which point 5 mL portions of solution C were added every 5 minutes for 1 hour. 7.5 mL 1-dodecanethiol were added over 1 hour using a syringe pump, while maintaining the temperature at 250° C., then the reaction was left to stir at 250° C. for a further hour, before cooling to 60° C. 400 mL acetone were added, followed by centrifugation (8,000 rpm, 30 mins). The residual solids were dispersed in 125 mL hexane.

The solution in hexane was added to an N2-filled 1 L flask containing 10 mL hexylamine and 50 mL propylamine. The reaction was stirred for 6 weeks. The solution was stripped of solvent, before re-dispersing in ~800 mL dry acetonitrile and stirring for 3 days. The material was cannula filtered, before extracting the solvent. The material was re-dispersed in 30 mL acetonitrile.

$H_2O$ Extraction and Purification. The acetonitrile was removed from the previously prepared solution by vacuum evaporation, before re-dispersing the material in toluene (30 mL). The toluene solution was placed in a separating funnel. Water (25 mL) was added to the separating funnel, then the mixture was shaken for 20 s, before allowing to settle. The water extracts were collected. The washing process was repeated until it had been performed a total of 20 times. Toluene (5 mL) was added to each fraction, followed by centrifugation at 9,000 rpm for 5 minutes to separate out the hazy toluene bubbles from the water phase. The toluene adlayer was separated from the water phase by combining all the fractions, and separating by the use of a separating funnel. The water solution was reduced to ~30 mL in volume and isolated as a pale yellow solution. A PL contour map of the material is shown in FIG. 1, which maps the PL emission (x-axis) against the excitation wavelength (y-axis). The PL contour map shows a distinct profile with two regions of high PL intensity: one with an excitation wavelength centred around 300 nm and the other with an excitation wavelength centred around 340 nm. The $PL_{max}$ is around 435 nm. The PLQY of the material in water was 77%.

Figure 2:
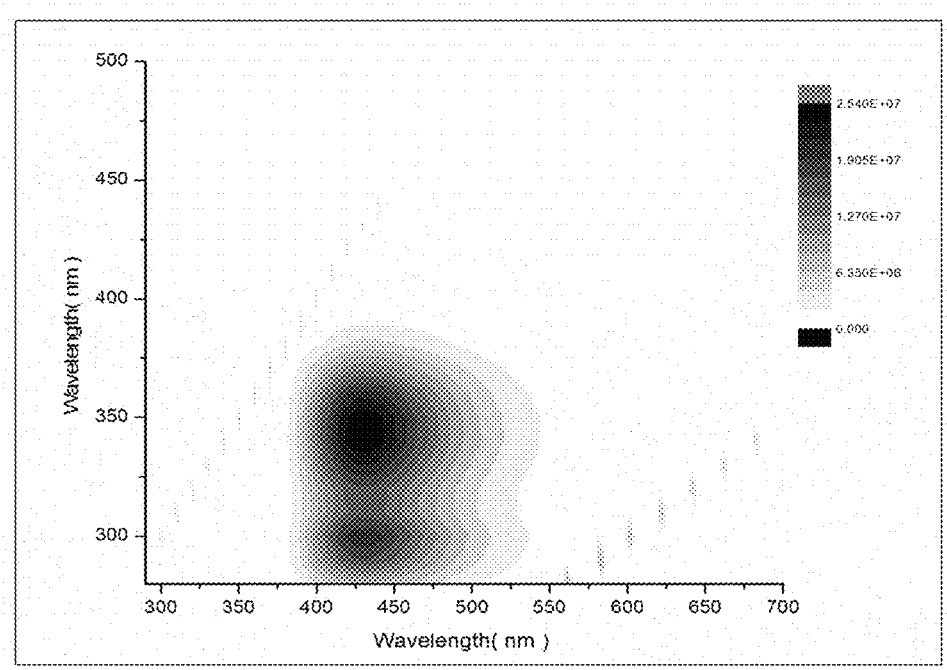
FIG. 2 is a PL contour map, which maps the PL emission (x-axis) against the excitation wavelength (y-axis), for a polyoxomolybdate compound treated with pyridine according to Example 1.

Pyridine Treatment and Isolation. The luminescent solution in water was added to a 100 mL round-bottomed flask, connected to a condenser with an attached distillation head. Pyridine (50 mL) was added to the flask before the reaction temperature was set to 105° C. for three hours. Initially the reaction did not heat above 96° C. as $H_2O$ evaporation occurred. The condensed $H_2O$ (which collected in the distillation head) was removed until no more $H_2O$ was evaporated; i.e. when the temperature of the reaction measured ~105° C.). At this point the colour of the solution changed from pale yellow to dark green. The reaction was left to stir at 105° C. for a further two hours. Once cooled, the pyridine in the reaction was evaporated by vacuum at 40° C. to leave a dark green solid. The solids were dissolved in acetone (20 mL) before precipitation with 100 mL hexane, centrifugation (8,000 rpm for 5 mins) and collection of the dark green solids. The resulting green powder was dried in a high vacuum for 72 hours. The material displayed good solubility in methanol, acetonitrile, and acetone. In acetonitrile, the PLQY was 92%. A PL contour map of the material is shown in FIG. 2, which maps the PL emission (x-axis) against the excitation wavelength (y-axis). As with the material prior to treatment with pyridine, the PL contour map shows a distinct profile with two regions of high PL intensity: one with an excitation wavelength centred around 300 nm and the other with an excitation wavelength centred around 340 nm. $PL_{max}$ is around 435 nm.

Following pyridine treatment, single crystals were grown by dissolving the material in acetonitrile, followed by slow evaporation of the acetonitrile solvent. Single crystal XRD revealed the material to be a polyoxomolybdate compound having a structure comprising $Mo_8O_{26}$ centres, each centre coordinated with two 1-hexyl, 2-pentyl, 4-,6-dimethyl pyridinium ligands and two hexylammonium ligands, $(C(C_5H_{11})CH_2CH(CH_3)CH_2CH(CH_3)N(C_6H_{13}))_2(C_6H_{13}NH_3)_2[\beta-Mo_8O_{26}]$.

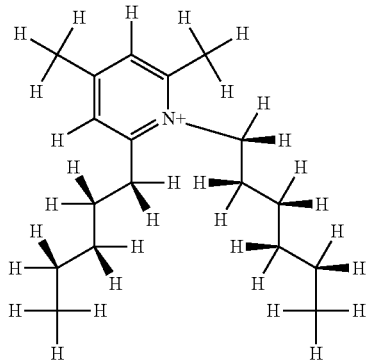

1-hexyl, 2-pentyl, 4-,6-dimethyl pyridinium

Figure 3:
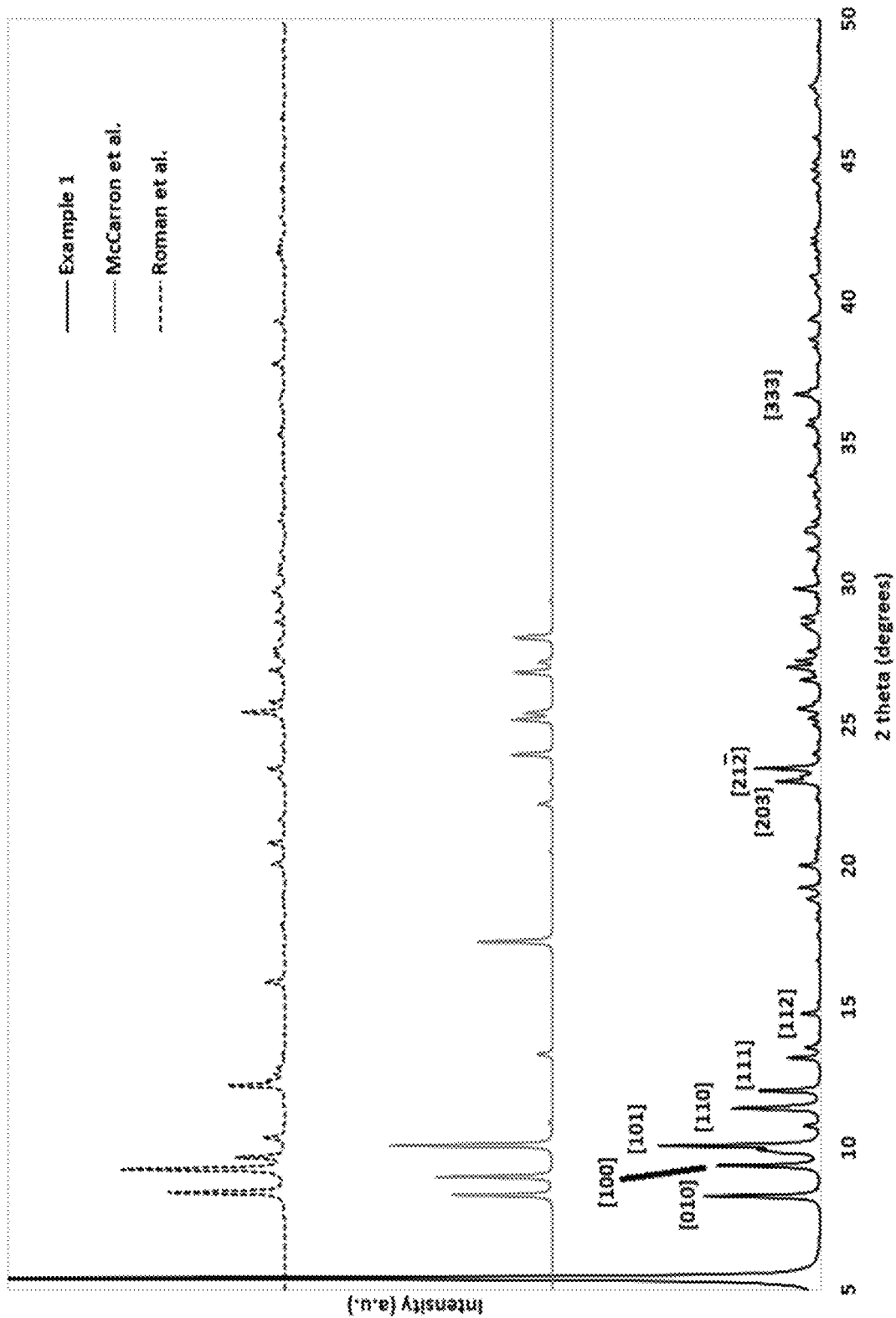
FIG. 3 is an X-ray diffraction (XRD) pattern of single crystals grown from the pyridine-treated polyoxomolybdate compound in Example 1 and compared to other polyoxomolybdate compounds in the art.

The single-crystal X-ray diffraction (XRD) pattern is shown in FIG. 3 (bottom pattern). Also shown, for comparison is XRD patterns for $(C_5H_5NH)_4[(C_5H_5N)_2Mo_8O_{26}]$ prepared by McCarron et al. (Inorg. Chem., 1984, 23, 3275; middle pattern) and 2-methylpyridinium β-octamolybdate ($[C_6H_8N]_4[Mo_8O_{26}]$) prepared by Roman et al. (Acta Cryst., 1986, C42, 956-958; top pattern). Table 1 provides a comparison of the XRD data of $(C(C_5H_{11})CH_2CH(CH_3)CH_2CH(CH_3)N(C_6H_{13}))_2(C_6H_{13}NH_3)_2[\beta-Mo_8O_{26}]$ (Example 1), $(C_5H_5NH)_4[(C_5H_5N)_2Mo_8O_{26}]$ (McCarron) and $[C_6H_8N]_4[Mo_8O_{26}]$ (Roman). In Table 1, only peaks from each XRD pattern having an intensity of at least 0.10 arbitrary units (a.u.) relative to the most intense peak (a.u.=1.00) are provided.

TABLE 1

| | Peak location (Degrees, 2θ)/Intensity (a.u.) | | |
|---|---|---|---|
| Peaks (#) | Example 1 | McCarron | Roman |
| 1 | 8.30/0.72 | 8.34/0.62 | 8.44/0.71 |
| 2 | 9.38/0.64 | 9.00/0.71 | 9.26/1.00 |
| 3 | 10.10/1.00 | 10.10/1.00 | 9.68/0.31 |
| 4 | 11.42/0.54 | 13.30/0.10 | 10.38/0.14 |
| 5 | 12.04/0.37 | 17.32/0.46 | 12.22/0.35 |
| 6 | 13.20/0.20 | 23.94/0.25 | 15.90/0.12 |
| 7 | 14.78/0.12 | 25.18/0.25 | 20.82/0.10 |
| 8 | 19.24/0.13 | 25.42/0.17 | 23.46/0.11 |
| 9 | 20.02/.013 | 26.84/0.24 | 25.46/0.26 |
| 10 | 23.00/0.28 | 28.08/0.24 | 26.94/0.10 |
| 11 | 23.46/0.48 | | |
| 12 | 25.58/0.14 | | |
| 13 | 26.60/0.12 | | |
| 14 | 27.06/0.21 | | |
| 15 | 27.28/0.15 | | |
| 16 | 28.56/0.11 | | |
| 17 | 28.82/0.12 | | |
| 18 | 29.82/0.16 | | |
| 19 | 36.72/0.16 | | |

Example 2: Inducing Emission in Non-Emissive [$Mo_8O_{26}$] Polyoxomolybdate Compound It has been found that emission can be induced in non-emissive material of the prior art by modification of the preparative procedure.

Example 2A (Prior Art)

In a method of synthesis previously reported in the literature, [E. M. McCarron, III, J. F. Whitney and D. B. Chase, Inorg. Chem., 1984, 23, 3275] $(C_5H_5NH)_4[(C_5H_5N)_2Mo_8O_{26}]$ was synthesized by heating molybdenum trioxide dihydrate (100 mg) in excess pyridine (5 mL) at 45° C. for 24 h. The resulting white powder was filtered, washed with acetone, then dried at 50° C. under vacuum. The resulting material showed no photoluminescence when dissolved in a mixture of dimethyl sulfoxide and pyridine.

Example 2B

The method of synthesis in Example 2A was repeated, replacing pyridine with hexylamine. Any unreacted/amine-insoluble material was separated by filtration, leaving a yellow material that was soluble in amine. The material was vacuumed until dry, dissolved in toluene, then extracted in water to yield a material emitting at 435 nm. The PLQY of the material increased on leaving the material to stand under nitrogen, reaching 33% after 48 h.

Example 3

The reaction was carried out under an inert N2 atmosphere. Dry acetonitrile (1 mL) was reacted with $Mo(CO)_6$ (0.1 g) for 16 h. Dry hexylamine (1 g) was added at 60° C. and reacted for 16 h. The reaction product was then split into four equivalent portions. The first portion was reacted with acetone (2 mL) followed by exposure to air for about 30 minutes. The second portion was reacted with 30% $H_2O_2$ in $H_2O$ (2 mL) followed by exposure to air for about 30 minutes. The third portion was reacted with $H_2O$ (2 mL) followed by exposure to air for about 30 minutes. The fourth portion was reacted with 2-propanol (2 mL) followed by exposure to air for about 30 minutes. In similar experiments where larger batch synthesis is performed (for example reaction products weighing 10 grams or more), air exposure times can be up to about 6 hours.

Only the reaction with acetone formed a blue-luminescing polyoxomolybdate compound. The blue-luminescing polyoxomolybdate compound was dissolved in toluene (50 mL) and extracted into water. In the first water wash, the blue-luminescing polyoxomolybdate compound exhibited a PLQY of 82%. After a second water wash, the PLQY fell to 43%. The second water wash solution was left to stand for two days in water, and the PLQY increased to 52%. To improve the PLQY, the blue-luminescing polyoxomolybdate compound was purified via vacuum extraction then dissolved in chloroform (50 mL) and extracted into water.

Figure 4:
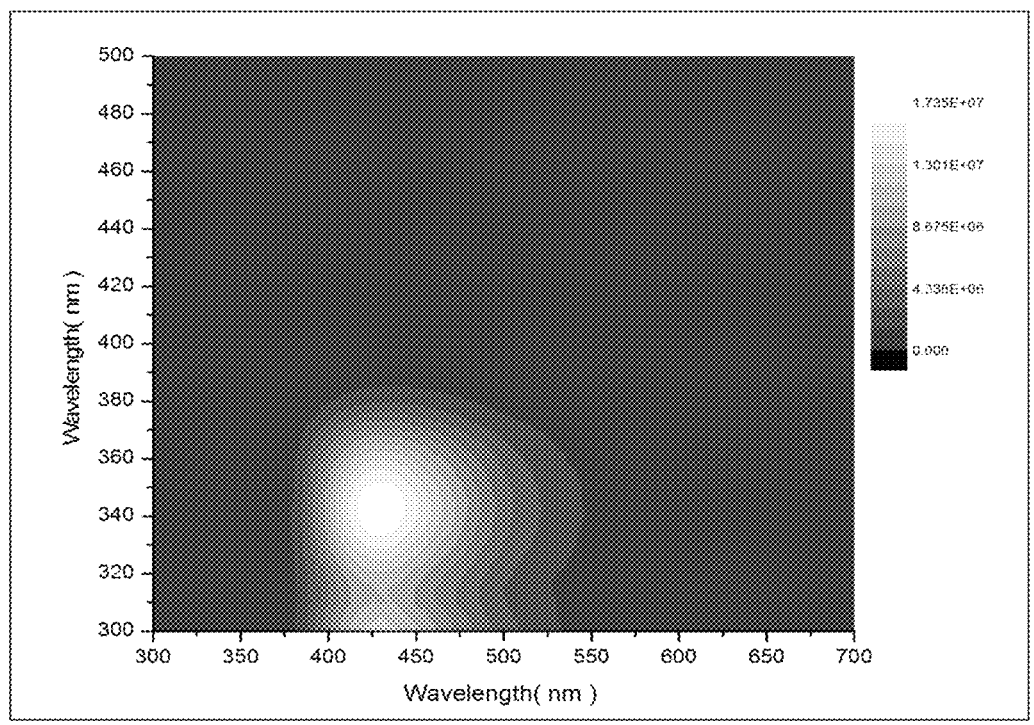
FIG. 4 is a PL contour map, which maps the PL emission (x-axis) against the excitation wavelength (y-axis), for another polyoxomolybdate compound formed according to Example 3.

FIG. 4 is a PL contour map, which maps the PL emission (x-axis) against the excitation wavelength (y-axis), for the polyoxomolybdate compound formed according to Example 4 and extracted into water. FIG. 4 indicates that the polyoxomolybdate compound exhibits a $PL_{max}$ centered around 435 nm and is at highest intensity at an excitation wavelength of about 340 nm. There is also suggestion of a second region of high PL intensity, as was observed for the polyoxomolybdate compound described in Example 1 (See FIG. 1), at an excitation wavelength below 300 nm.

Example 4

In this example, blue luminescent polyoxometalate compounds were directly synthesized from molybdenum or tungsten precursors.

Synthesis of non-emissive $Mo_8O_{26}[C_6H_{13}NH_3]_4$. To 100 mL of deionized water (DI $H_2O$), 5 g (24.2 mmol) $Na_2MoO_4$ was added and solubilized. To the solution, 13.5 mL (5 equiv.) of 1-hexylamine was added with vigorous stirring. The pH value of the solution was adjusted to 5 with 1 M HCl. A product formed as a white precipitate, which was filtered and washed with cold water (one time) and MeOH (five times) and dried for 24 h under high vacuum.

Synthesis of non-emissive $Mo_8O_{26}[C_4H_9NH(C_2H_4OH)_2]_4$. To 60 mL of DI $H_2O$, 3 g (14.5 mmol) of $Na_2MoO_4$ was added and solubilized. To the solution $C_4H_9N(C_2H_4OH)_2$ (10 g, 62 mmol, 5 equiv.) was added and the pH value of the solution was adjusted to 4.0 with 1 M HCl. A solid product formed, which was filtered and washed with cold water (one time) and MeOH (five times).

Synthesis of N-hexyl-2,4,6-trimethylpyridinium bromide. To 5 mL (38 mmol) of 2,4,6-trimethylpyridine, 5.32 mL (1 equiv.) of 1-bromohexane was added. The solution was brought to reflux temperature (~105° C.) and reacted for 72 h. The solution was then cooled to room temperature (RT) and a solid product was formed. The solid product was filtered, washed with hexane (ten times) and dried under high vacuum to obtain a white powder.

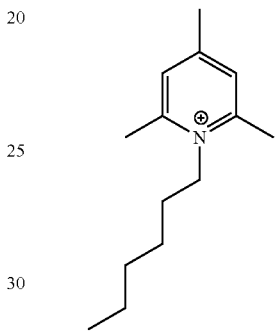

N-hexyl-2,4,6-trimethylpyridinium bromide

Synthesis of blue-emitting polyoxomolybdate or polyoxotungstate compounds. To 0.1 g Mo or W precursor (Table 2, Col. 1), 0.03 g of a pyridinium salt (Table 2, Col. 2; ~1 equiv.) was added followed by 2 mL solvent (Table 2, Col. 3). The reaction was left to stir at 150° C. for 72 h. The product solution was cooled to room temperature, dispersed in 30 mL of acetonitrile (MeCN), centrifuged at 8,000 rpm for 5 min and filtered using a syringe filter. The volatile solvent fraction of obtained solution was removed using rotary evaporation. The residual solvent was removed by high vacuum at 100° C. Following solvent removal, product was isolated by sublimation as crystals with blue luminescence.

TABLE 2

| METAL PRECURSOR | PYRIDINIUM PRECURSOR | SOLVENT | $PL_{MAX}$, nm ± 5 nm | QY, % |
|---|---|---|---|---|
| [1] $Mo_8O_{26}[C_6H_{13}NH_3]_4 \cdot xH_2O$ Hexylammonium octamolybdate | N-hexyl-2,4,6-trimethylpyridinium bromide | Formamide | 410 | 55 |
| [2] $Mo_8O_{26}[C_4H_9NH(C_2H_4OH)_2]_4 \cdot xH_2O$ Octamolybdate N-tert-butyldiethanolamine complex | N-hexyl-2,4,6-trimethylpyridinium bromide | Formamide | 410 | 74 |
| [3] $MoO_3 \cdot H_2O$ (Molybdic acid) | N-hexyl-2,4,6-trimethylpyridinium bromide | Formamide | 400 | 61 |
| [4] Molybdic acid | N-hexyl-2,4,6-trimethylpyridinium bromide | Propylene glycol | 410 | 10.5 |
| [5] Molybdic acid | N-hexyl-2,4,6-trimethylpyridinium bromide | 1,4-Butanediol | 410 | 29 |
| [6] Molybdic acid | N-hexyl-2,4,6-trimethylpyridinium bromide | Diethylene glycol | 410 | 21.6 |

TABLE 2-continued

| METAL PRECURSOR | PYRIDINIUM PRECURSOR | SOLVENT | PL$_{MAX}$, nm ± 5 nm | QY, % |
|---|---|---|---|---|
| [7] Molybdic acid | 1,2,4,6-tetramethylpyridinium iodide | Formamide | 410 | 35 |
| [8] Molybdic acid | 1,2,4,6-tetramethylpyridinium iodide | Diethylene Glycol | 400 | 15 |
| [9] MoO$_3$ (anhydrous) | N-hexyl-2,4,6-trimethylpyridinium bromide | Formamide | 400 | 49 |
| [10] WO$_3$·H$_2$O (Tungstic acid) | 1,2,4,6-tetramethylpyridinium iodide | Formamide | 410 | 34 |
| [11] Tungstic acid | N-hexyl-2,4,6-trimethylpyridinium bromide | Formamide | 420 | 44 |
| [12] WO$_3$ (anhydrous) | 1,2,4,6-tetramethylpyridinium iodide | Formamide | 415 | 29 |
| [13] WO$_3$ (anhydrous) | N-hexyl-2,4,6-trimethylpyridinium bromide | Formamide | 400 | 61 |
| [14] WO$_3$ (anhydrous) | 1,2,4,6-tetramethylpyridinium iodide | Diethylene glycol | 435 | 5 |

Figure 5:
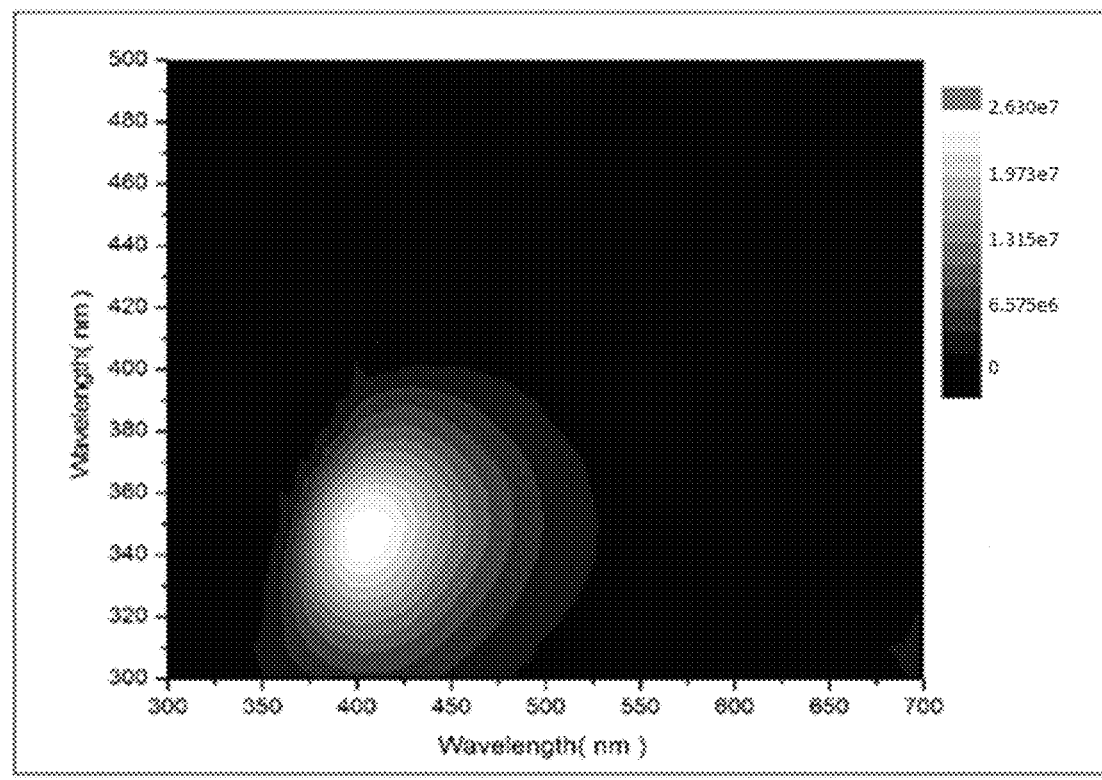
FIG. 5 is a PL contour map, which maps the PL emission (x-axis) against the excitation wavelength (y-axis), for the polyoxomolybdate compound formed according to reaction 1 (Table 2, row 1) of Example 4.
Figure 6:
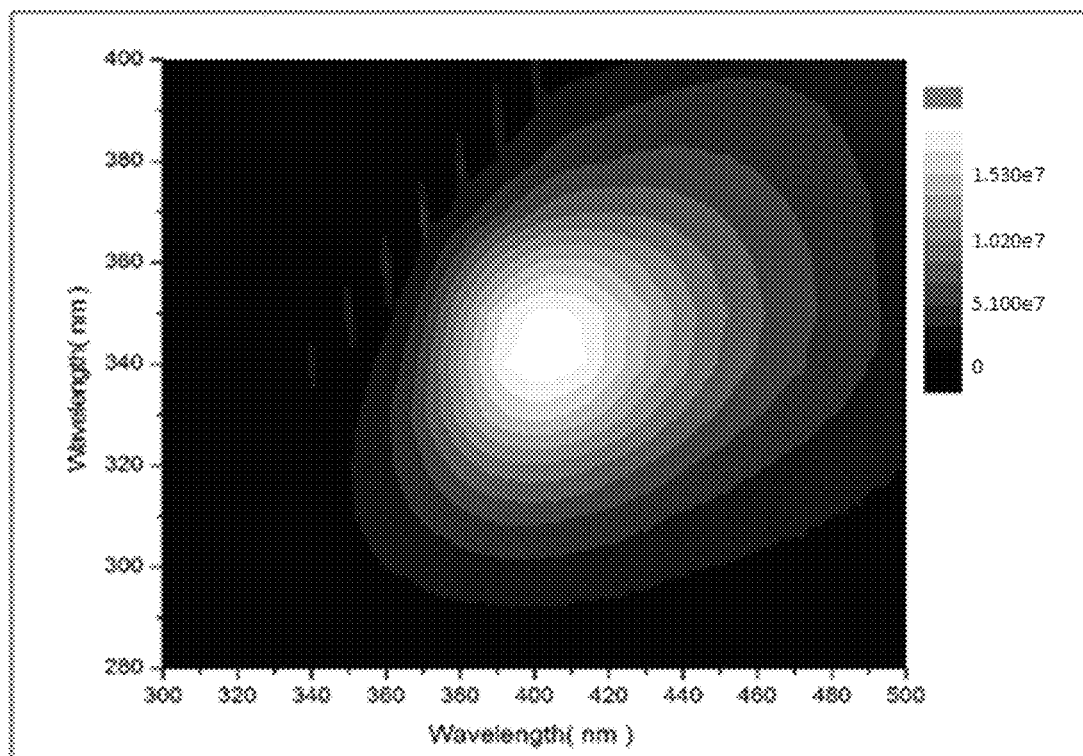
FIG. 6 is a PL contour map, which maps the PL emission (x-axis) against the excitation wavelength (y-axis), for the polyoxomolybdate compoundformed according to reaction 2 (Table 2, row 2) of Example 4.
Figure 7:
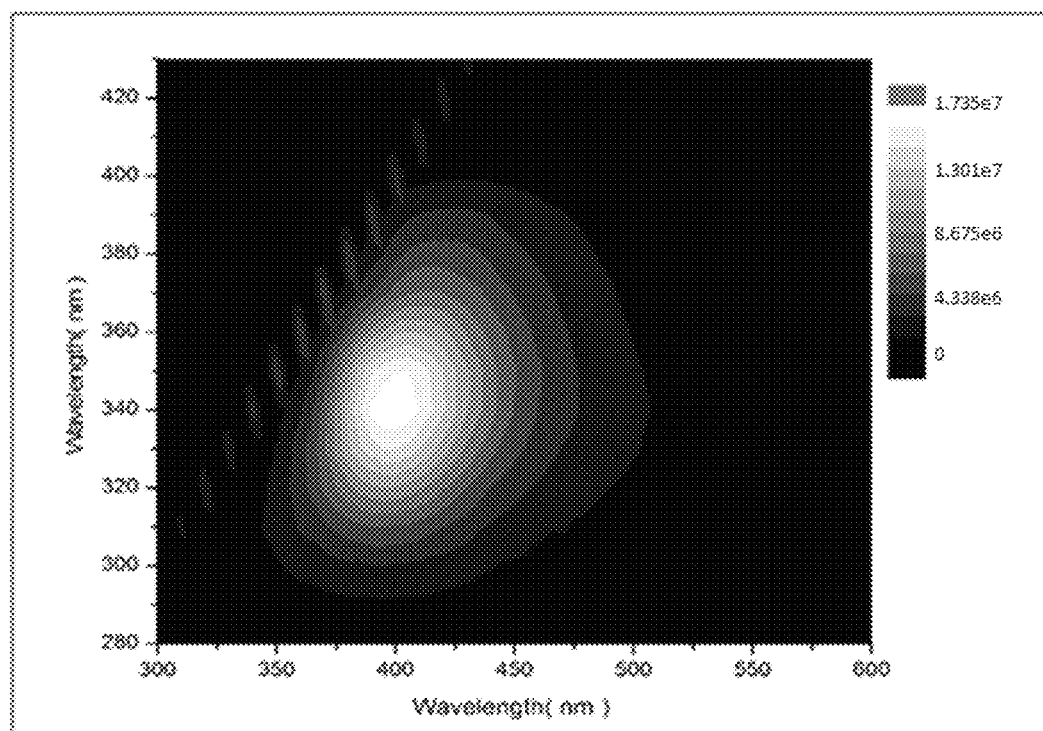
FIG. 7 is a PL contour map, which maps the PL emission (x-axis) against the excitation wavelength (y-axis), for the polyoxomolybdate compound formed according to reaction 3 (Table 2, row 3) of Example 4.
Figure 8:
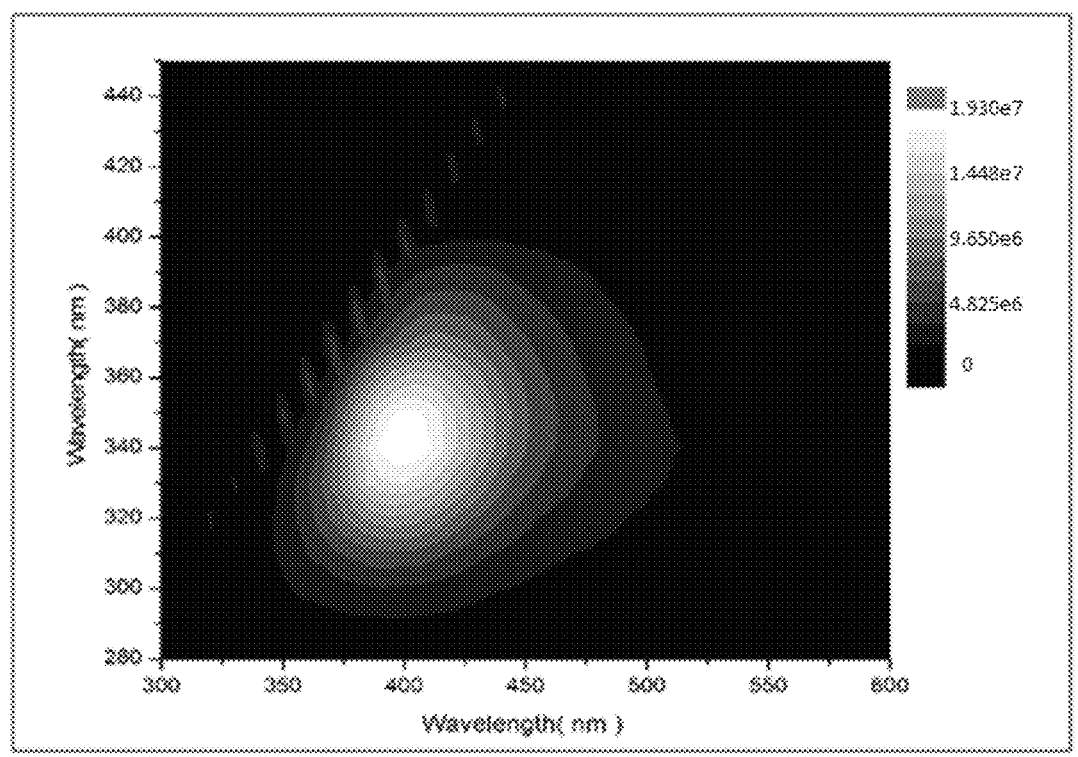
FIG. 8 is a PL contour map, which maps the PL emission (x-axis) against the excitation wavelength (y-axis), for the polyoxomolybdate compound formed according to reaction 9 (Table 2, row 9) of Example 4.
Figure 9:
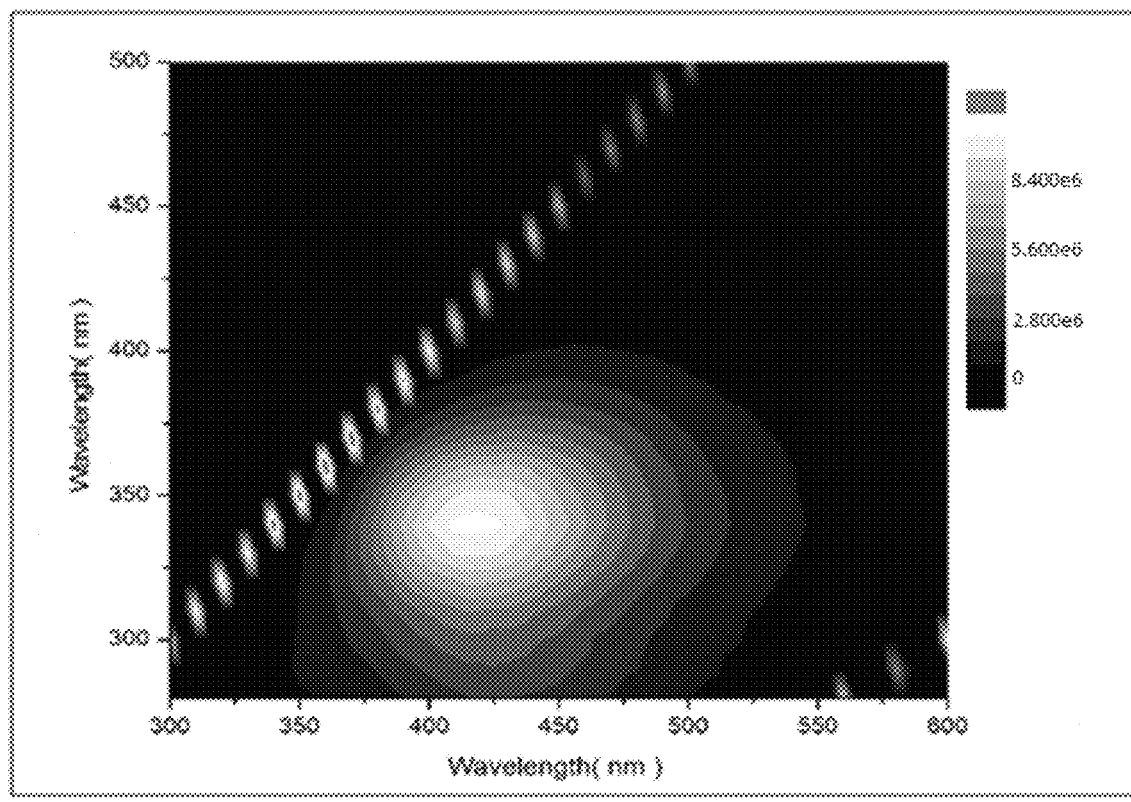
FIG. 9 is a PL contour map, which maps the PL emission (x-axis) against the excitation wavelength (y-axis), for the polyoxotungstate compound formed according to reaction 11 (Table 2, row 11) of Example 4.
Figure 10:
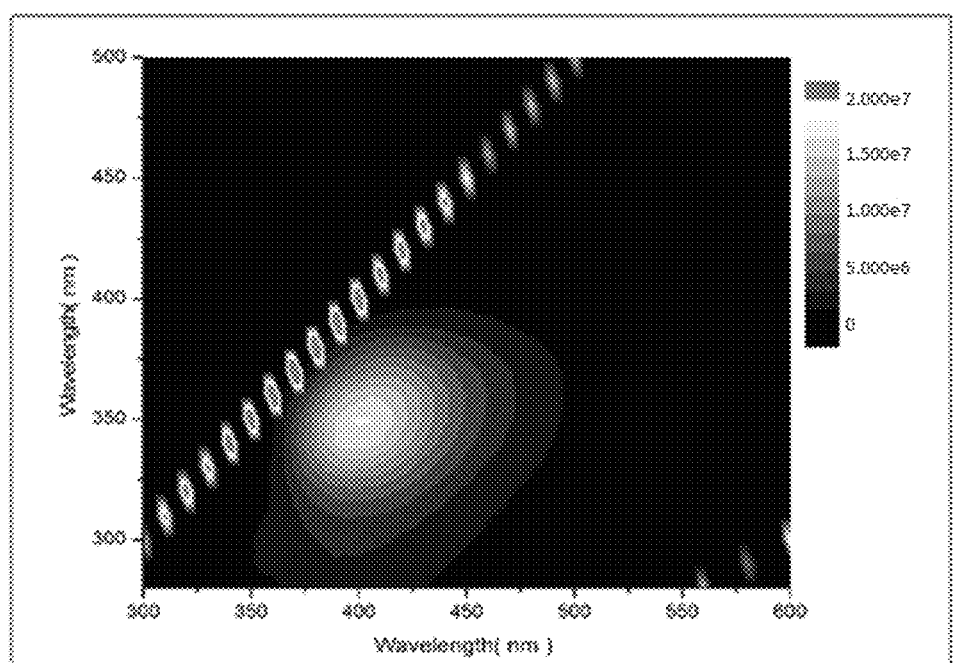
FIG. 10 is a PL contour map, which maps the PL emission (x-axis) against the excitation wavelength (y-axis), for the polyoxotungstate compound according to reaction 13 (Table 2, row 13) of Example 4.

FIG. 5 is a PL contour map, which maps the PL emission (x-axis) against the excitation wavelength (y-axis), for the polyoxomolybdate compound formed according to reaction 1 (Table 2, row 1) of Example 4. FIG. 6 is a PL contour map, which maps the PL emission (x-axis) against the excitation wavelength (y-axis), for the polyoxomolybdate compound formed according to reaction 2 (Table 2, row 2) of Example 4. FIG. 7 is a PL contour map, which maps the PL emission (x-axis) against the excitation wavelength (y-axis), for the polyoxomolybdate compound formed according to reaction 3 (Table 2, row 3) of Example 4. FIG. 8 is a PL contour map, which maps the PL emission (x-axis) against the excitation wavelength (y-axis), for the polyoxomolybdate compound formed according to reaction 9 (Table 2, row 9) of Example 4. FIG. 9 is a PL contour map, which maps the PL emission (x-axis) against the excitation wavelength (y-axis), for the polyoxotungstate compound formed according to reaction 11 (Table 2, row 11) of Example 4. FIG. 10 is a PL contour map, which maps the PL emission (x-axis) against the excitation wavelength (y-axis), for the polyoxotungstate compound formed according to reaction 13 (Table 2, row 13) of Example 4.

Example 5. Synthesis and Crystal Structure of Blue-Light Emitting Polyoxomolybdate Compound In this example, a blue-light emitting polyoxomolybdate compound is synthesized and its crystal structure is analyzed.

Synthesis of non-emissive Mo$_8$O$_{26}$[C$_6$H$_{13}$NH$_3$]$_4$. To 100 mL of deionized water (DI H$_2$O), 5 g (24.2 mmol) Na$_2$MoO$_4$ was added and solubilized. To the solution, 13.5 mL (5 equiv.) of 1-hexylamine was added with vigorous stirring. The pH value of the solution was adjusted to 5 with 1 M HCl. A product formed as a white precipitate, which was filtered and washed with cold water (one time) and MeOH (five times) and dried for 24 h under high vacuum.

Figure 11:
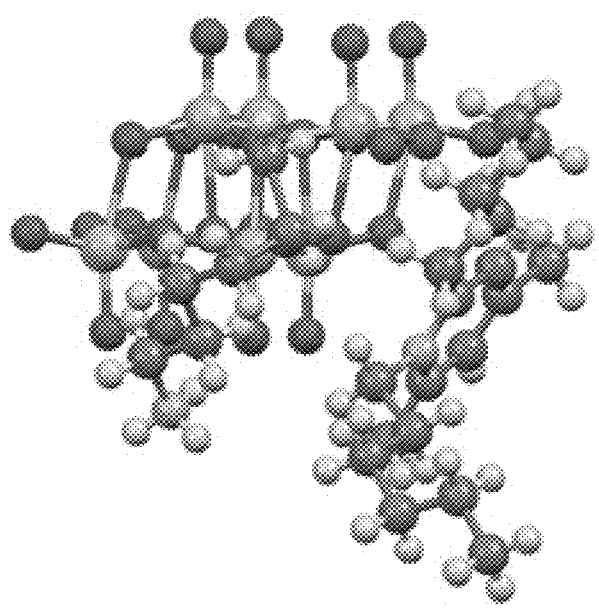
FIG. 11 is a visual representation of a unit cell of a single crystal of a polyoxomolybdate compound prepared in accordance with various aspects of the present disclosure.
Figure 12:
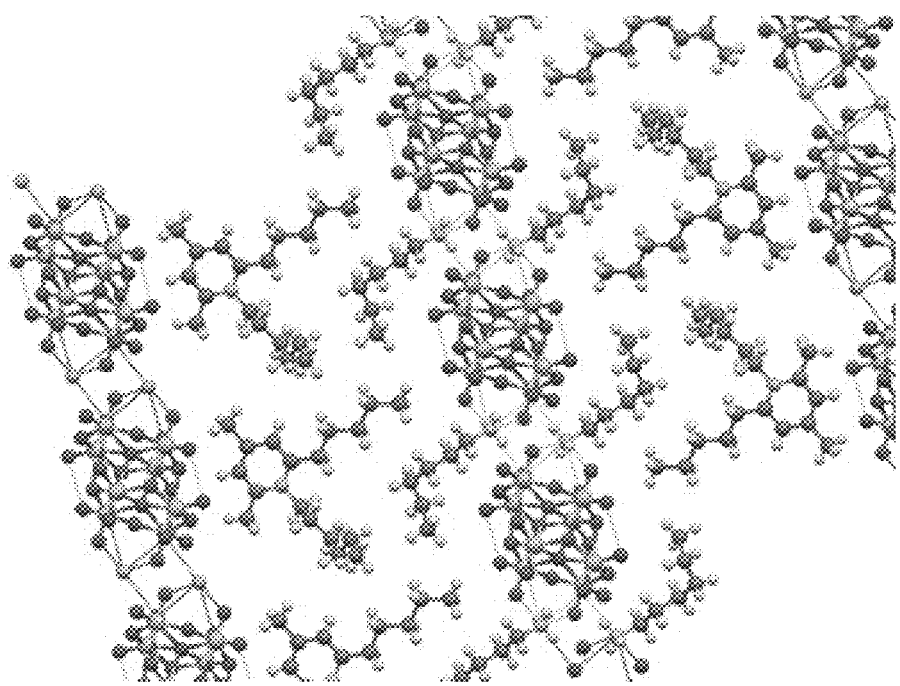
FIG. 12 is a visual representation of a 2D crystal structure of a polyoxomolybdate compound, including the unit cell of FIG. 11, prepared in accordance with various aspects of the present disclosure.
Figure 13:
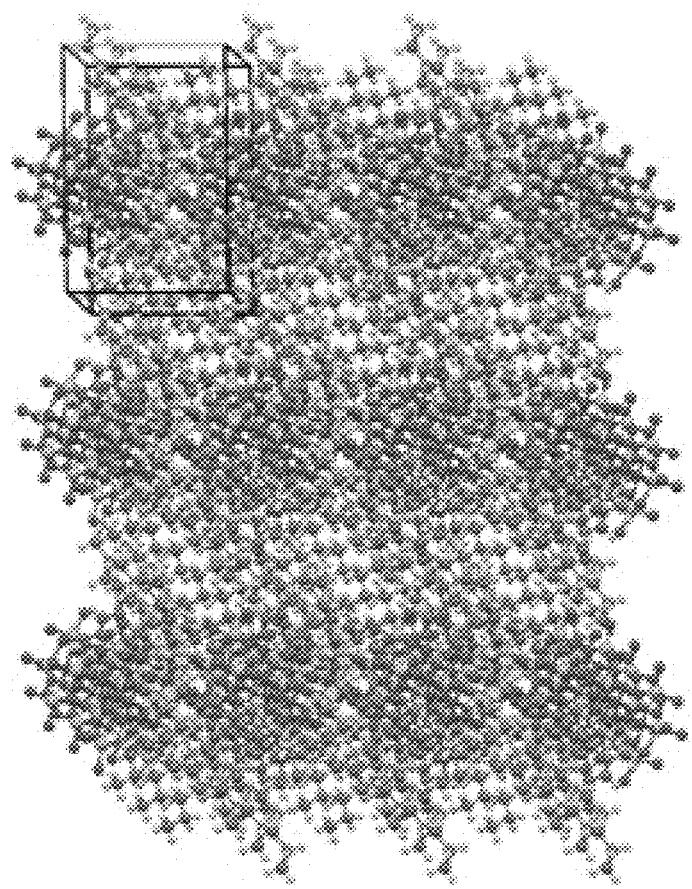
FIG. 13 is a visual representation of a 3D crystal structure of the polyoxomolybdate compound depicted in FIG. 12.

Synthesis of blue-emitting polyoxomolybdate compound. To 0.1 g Mo$_8$O$_{26}$[C$_6$H$_{13}$NH$_3$]$_4$, 0.03 g (~1 equiv.) of 1-hexyl,2-pentyl,4,6-dimethyl pyridinium was added followed by 2 mL of formamide. The reaction was left to stir at 150° C. for 72 h. The product solution was cooled to room temperature, dispersed in 30 mL MeCN, centrifuged at 8,000 rpm for 5 min and filtered using a syringe filter. The volatile solvent fraction of obtained solution was removed using rotary evaporation. The residual solvent was removed by high vacuum at 100° C. Following solvent removal, product was isolated by sublimation as crystals of (C(C$_5$H$_{11}$)CH$_2$CH(CH$_3$)CH$_2$CH(CH$_3$)N(C$_6$H$_{13}$))$_2$(C$_6$H$_{13}$NH$_3$)$_2$[Mo$_8$O$_{26}$] with blue luminescence. FIGS. 11-13 show the unit cell, 2D and 3D crystal structures, obtained by single crystal XRD, of the resulting polyoxomolybdate compound. As shown, each 1-hexylammonium ion coordinates to two adjacent [Mo$_8$O$_{26}$]$^{4-}$ clusters while the 1-hexyl,2-pentyl,4,6-dimethyl pyridinium ions are disposed between planes of [Mo$_8$O$_{26}$]$^{4-}$ clusters. As may be appreciated the size, shape and composition of each of the protonated alkyl amine and cationic portion of the organic salt used in the synthesis of polyoxometalate compounds may synergistically affect the distance between adjacent polyoxometalate clusters in the same plane and/or between polyoxometalate cluster is adjacent planes. It is believed the blue-emitting molybdate or tungstate compounds prepared in Example 4 exhibit 2D and 3D crystal structures of varying degrees of similarity.

STATEMENTS OF THE DISCLOSURE

Statements of the Disclosure include:

Statement 1: A method of making a photoluminescent polyoxometalate compound, the method comprising reacting a metal precursor with an organic salt in a solvent at an elevated temperature to form the photoluminescent polyoxometalate compound; isolating the photoluminescent polyoxometalate compound from the solvent; and crystallizing the photoluminescent polyoxometalate compound.

Statement 2: A method according to Statement 1, wherein the metal precursor is a molybdenum-containing precursor.

Statement 3: A method according to Statement 2, wherein the molybdenum-containing precursor is selected from the group consisting of MoO$_3$, MoO$_3$.H$_2$O, Mo(CO)$_6$, H$_2$MoO$_4$, Li$_2$MoO$_4$, Na$_2$MoO$_4$, Na$_2$MoO$_4$.2H$_2$O, K$_2$MoO$_4$, (NH$_4$)$_2$MoO$_4$, (NH$_4$)$_6$Mo$_7$O$_{24}$.4H$_2$O, ZnMoO$_4$, FeMoO$_4$, PbMoO$_4$, and Bi$_2$Mo$_3$O$_{12}$.

Statement 4: A method according to Statement 1, wherein the metal precursor is a tungsten-containing precursor.

Statement 5: A method according to Statement 4, wherein the tungsten-containing precursor is selected from the group consisting of $W(CO)_6$, $WO_3$, $WO_3.H_2O$, $CaWO_4$, $Li_2WO_4$, $Na_2WO_4.2H_2O$, $3Na_2WO_4.9WO_3$, $K_2WO_4$, $BaWO_4$, $CdWO_4$, $MgWO_4$, $(NH_4)_6H_2W_{12}O_{40}.xH_2O$, $(NH_4)_{10}H_2(W_2O_7)_6$, and $H_2WO_4$.

Statement 6: A method according to Statement 1, wherein the metal precursor is a chromium-containing precursor.

Statement 7: A method according to Statement 6, wherein the chromium-containing precursor is selected from the group consisting of $Cr(CO)_6$, $CrO_3$, $K_2CrO_4$, $Na_2CrO_4$, $Na_2CrO_4.4H_2O$, $BaCrO_4$, $Ag_2CrO_4$, $CaCrO_4$, $(NH_4)_2CrO_4$, $PbCrO_4$, $Rb_2CrO_4$, $[(C_6H_5)_3SiO]_2CrO_2$, $K_3Cr(C_2O_4)_3.3H_2O$, and $CrO_2Cl_2$.

Statement 8: A method according to Statement 1, wherein the metal precursor is a vanadium-containing precursor.

Statement 9: A method according to Statement 8, wherein the vanadium-containing precursor is selected from the group consisting of $NaVO_3$, $(Ph_3SiO)_3VO_3$, $NH_4VO_3$, $AgVO_3$, $V_2O_5$, $V_2O_4$, and $V_2O_3$.

Statement 10: A method according to any one of Statements 1-9, wherein the organic salt is any one of a pyridinium salt, a quinolinium salt, an isoquinolinium salt, a pyrazinium salt, a pyrimidinium salt, an indolium salt, a benzoxazolium salt, a benzimidazolium salt, a thiazolium salt, a benzothiazolium salt, a pyrylium salt, or a thiopyrylium salt.

Statement 11: A method according to any one of Statements 1-10, wherein the organic salt comprises an organic cation and an anion selected from the group consisting of $F^-$, $Cl^-$, $Br^-$, $I^-$, $NO_3^-$, $NO_2^-$, $HSO_4^-$, $ClO_4^-$, $ClO_3^-$, $OCl^-$, $OBr^-$, $CH_3SO_3^-$, $CF_3SO_3^-$, $CH_3C_6H_4SO_3^-$, $BF_4^-$, $PF_6^-$, $SbF_6^-$, and $CH_3COO^-$.

Statement 12: A method according to any one of Statements 1-11, wherein the elevated temperature is from about 60° C. to about 250° C.

Statement 13: A method according to any one of Statements 1-12, wherein the solvent is formamide.

Statement 14: A method according to any one of Statements 1-3 and 10-13, wherein the polyoxometalate compound is a polyoxomolybdate compound.

Statement 15: A method according to any one of Statements 1, 4-5 and 10-13, wherein the polyoxometalate compound is a polyoxotungstate compound.

Statement 16: A method according to any one of Statements 1, 6-7 and 10-13, wherein the polyoxometalate compound is a polyoxochromate compound.

Statement 17: A method according to any one of Statements 1 and 8-13, wherein the polyoxometalate compound is a polyoxovanadate compound.

Statement 18: A method according to any one of Statements 1-17, wherein the polyoxometalate compound exhibits a PL maximum ($PL_{max}$) in the blue region of the electromagnetic spectrum.

Statement 19: A method according to any one of Statements 1-18, wherein the polyoxometalate compound exhibits a PL maximum ($PL_{max}$) in the violet region of the electromagnetic spectrum.

Statement 20: A method of making a photoluminescent polyoxometalate compound, the method comprising reacting a metal precursor with a Lewis base in under acidic conditions to form a non-photoluminescent polyoxometalate compound; reacting the non-photoluminescent polyoxometalate compound with an organic salt in a solvent at an elevated temperature to form the photoluminescent polyoxometalate compound; isolating the photoluminescent polyoxometalate compound from the solvent; and crystallizing the photoluminescent polyoxometalate compound.

Statement 21: A method according to Statement 20, wherein the metal precursor is a molybdenum-containing precursor.

Statement 22: A method according to Statement 21, wherein the molybdenum-containing precursor is selected from the group consisting of $MoO_3$, $MoO_3.H_2O$, $Mo(CO)_6$, $H_2MoO_4$, $Li_2MoO_4$, $Na_2MoO_4$, $Na_2MoO_4.2H_2O$, $K_2MoO_4$, $(NH_4)_2MoO_4$, $(NH_4)_6Mo_7O_{24}.4H_2O$, $ZnMoO_4$, $FeMoO_4$, $PbMoO_4$, and $Bi_2Mo_3O_{12}$.

Statement 23: A method according to Statement 20, wherein the metal precursor is a tungsten-containing precursor.

Statement 24: A method according to Statement 23, wherein the tungsten-containing precursor is selected from the group consisting of $W(CO)_6$, $WO_3$, $WO_3.H_2O$, $CaWO_4$, $Li_2WO_4$, $Na_2WO_4.2H_2O$, $3Na_2WO_4.9WO_3$, $K_2WO_4$, $BaWO_4$, $CdWO_4$, $MgWO_4$, $(NH_4)_6H_2W_{12}O_{40}.xH_2O$, $(NH_4)_{10}H_2(W_2O_7)_6$, and $H_2WO_4$.

Statement 25: A method according to Statement 20, wherein the metal precursor is a chromium-containing precursor.

Statement 26: A method according to Statement 25, wherein the chromium-containing precursor is selected from the group consisting of $Cr(CO)_6$, $CrO_3$, $K_2CrO_4$, $Na_2CrO_4$, $Na_2CrO_4.4H_2O$, $BaCrO_4$, $Ag_2CrO_4$, $CaCrO_4$, $(NH_4)_2CrO_4$, $PbCrO_4$, $Rb_2CrO_4$, $[(C_6H_5)_3SiO]_2CrO_2$, $K_3Cr(C_2O_4)_3.3H_2O$, and $CrO_2Cl_2$.

Statement 27: A method according to Statement 20, wherein the metal precursor is a vanadium-containing precursor.

Statement 28: A method according to Statement 27, wherein the vanadium-containing precursor is selected from the group consisting of $NaVO_3$, $(Ph_3SiO)_3VO_3$, $NH_4VO_3$, $AgVO_3$, $V_2O_5$, $V_2O_4$, and $V_2O_3$.

Statement 29: A method according to any one of Statements 20-28, wherein the organic salt is any one of a pyridinium salt, a quinolinium salt, an isoquinolinium salt, a pyrazinium salt, a pyrimidinium salt, an indolium salt, a benzoxazolium salt, a benzimidazolium salt, a thiazolium salt, a benzothiazolium salt, a pyrylium salt, or a thiopyrylium salt.

Statement 30: A method according to any one of Statements 20-29, wherein the organic salt comprises an organic cation and an anion selected from the group consisting of $F^-$, $Cl^-$, $Br^-$, $I^-$, $NO_3^-$, $NO_2^-$, $HSO_4^-$, $ClO_4^-$, $ClO_3^-$, $OCl^-$, $OBr^-$, $CH_3SO_3^-$, $CF_3SO_3^-$, $CH_3C_6H_4SO_3^-$, $BF_4^-$, $PF_6^-$, $SbF_6^-$, and $CH_3COO^-$.

Statement 31: A method according to any one of Statements 20-30, wherein the elevated temperature is from about 60° C. to about 250° C.

Statement 32: A method according to any one of Statements 20-31, wherein the solvent is formamide.

Statement 33: A method according to any one of Statements 20-22 and 29-32, wherein the polyoxometalate compound is a polyoxomolybdate compound.

Statement 34: A method according to any one of Statements 20, 23-24 and 29-32, wherein the polyoxometalate compound is a polyoxotungstate compound.

Statement 35: A method according to any one of Statements 20, 25-26 and 29-32, wherein the polyoxometalate compound is a polyoxochromate compound.

Statement 36: A method according to any one of Statements 20 and 27-32, wherein the polyoxometalate compound is a polyoxovanadate compound.

Statement 37: A method according to any one of Statements 20-36, wherein the polyoxometalate compound exhibits a PL maximum ($PL_{max}$) in the blue region of the electromagnetic spectrum.

Statement 38: A method according to any one of Statements 20-37, wherein the polyoxometalate compound exhibits a PL maximum ($PL_{max}$) in the violet region of the electromagnetic spectrum.

Statement 39: A method according to any one of Statements 20-38, wherein the acidic conditions are obtained using a strong acid.

Statement 40: A method according to Statement 39, wherein the strong acid is HCl.

Statement 41: A method according to any one of Statements 20-40, wherein the acidic conditions are a pH of less than 5.

Statement 42: A method according to any one of Statements 20-41, wherein the Lewis base is a primary alkyl amine, a secondary alkyl amine, a tertiary alkyl amine, an oxonium compound, a sulfonium compound, a sulfoxonium compound, or a phosphonium compound.

Statement 43: A luminescent crystalline polyoxometalate compound of the formula:

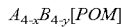

wherein
A is a protonated alkyl amine;
B is a cationic portion of an organic salt;
x,y≤4, x+y=4; and
POM is a polyoxometalate cluster.

Statement 44: A compound according to Statement 43, wherein y=2.

Statement 45: A compound according to Statement 43, wherein y=0.

Statement 46: A compound according to any one of Statements 43-45, wherein the polyoxometalate cluster is a polyoxotungstate cluster.

Statement 47: A compound according to any one of Statements 43-45, wherein the polyoxometalate cluster is a polyoxochromate cluster.

Statement 48: A compound according to any one of Statements 43-45, wherein the polyoxometalate cluster is a polyoxovanadate cluster.

Statement 49: A compound according to any one of Statements 43-45, wherein the polyoxometalate cluster is a polyoxomolybdate cluster.

Statement 50: A compound according to Statement 49, wherein the polyoxomolybdate cluster is a $[Mo_8O_{26}]^{4-}$ cluster.

Statement 51: A compound according to any one of Statements 43-50, wherein A is a 1-hexylammonium ion, x=2, B is a 1-hexyl, 2-pentyl, 4-,6-dimethyl pyridinium ion, and y=2.

Statement 52: A compound according to any one of Statements 43-51, wherein the compound exhibits a photoluminescence quantum yield (PLQY) of up to 92%.

Statement 53: A compound according to any one of Statements 43-52, wherein the compound exhibits a PL maximum ($PL_{max}$) of about 435 nm.

Statement 54: A compound according to any one of Statements 43-51, wherein the compound exhibits a PLQY of at least 29% and up to 74%.

Statement 55: A compound according to any one of Statements 43-52, wherein the compound exhibits a $PL_{max}$ of between about 400 and about 435 nm.

Statement 56: A compound according to any one of Statements 43-55, wherein the organic salt is any one of a pyridinium salt, a quinolinium salt, an isoquinolinium salt, a pyrazinium salt, a pyrimidinium salt, an indolium salt, a benzoxazolium salt, a benzimidazolium salt, a thiazolium salt, a benzothiazolium salt, a pyrylium salt, or a thiopyrylium salt.

The foregoing presents particular embodiments embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A method of making a photoluminescent polyoxometalate compound of the formula:

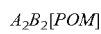

wherein
A is a protonated $C_3$-$C_{20}$ alkyl amine;
B is a pyridinium ion having the formula:

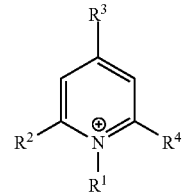

wherein
$R^1$ is an alkyl group;
$R^2$ and $R^3$ are H, alkyl, alkoxy, nitro, nitrile, halogen, acyl or thiol groups; and
$R^4$ is an alkyl, alkoxy, nitro, nitrile, halogen, acyl or thiol group; and
POM is a $[Mo_8O_{26}]^{4-}$ cluster or a $[W_8O_{26}]^{4-}$ cluster, the method comprising:
reacting a molybdenum-containing precursor or a tungsten-containing precursor with an organic salt in a solvent at an elevated temperature to form the photoluminescent polyoxometalate compound;
isolating the photoluminescent polyoxometalate compound from the solvent; and
crystallizing the photoluminescent polyoxometalate compound.

2. The method of claim 1, wherein a molybdenum-containing precursor is reacted with the organic salt in the solvent at the elevated temperature to form the photoluminescent polyoxometalate compound.

3. The method of claim 2, wherein the molybdenum-containing precursor is selected from the group consisting of $MoO_3$, $MoO_3 \cdot H_2O$, $Mo(CO)_6$, $H_2MoO_4$, $Li_2MoO_4$, $Na_2MoO_4$, $Na_2MoO_4 \cdot 2H_2O$, $K_2MoO_4$, $(NH_4)_2MoO_4$, $(NH_4)_6Mo_7O_{24} \cdot 4H_2O$, $ZnMoO_4$, $FeMoO_4$, $PbMoO_4$, and $Bi_2Mo_3O_{12}$.

4. The method of claim 1, wherein a tungsten-containing precursor is reacted with the organic salt in the solvent at the elevated temperature to form the photoluminescent polyoxometalate compound.

5. The method of claim 4, wherein the tungsten-containing precursor is selected from the group consisting of $W(CO)_6$, $WO_3$, $WO_3 \cdot H_2O$, $CaWO_4$, $Li_2WO_4$, $Na_2WO_4 \cdot 2H_2O$, $3Na_2WO_4 \cdot 9WO_3$, $K_2WO_4$, $BaWO_4$, $CdWO_4$, $MgWO_4$, $(NH_4)_6H_2W_{12}O_{40} \cdot xH_2O$, $(NH_4)_{10}H_2(W_2O_7)_6$, and $H_2WO_4$.

6. The method of claim 1, wherein the elevated temperature is from about 60° C. to about 250° C.

7. The method of claim 1, wherein the solvent is formamide.

8. A luminescent crystalline polyoxometalate compound of the formula:

$$A_2B_2[POM]$$

wherein

A is a protonated $C_3$-$C_{20}$ alkyl amine;

B is a pyridinium ion having the formula:

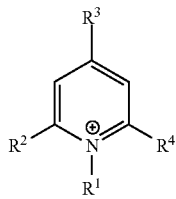

wherein $R^1$ is an alkyl group;

$R^2$ and $R^3$ are H, alkyl, alkoxy, nitro, nitrile, halogen, acyl or thiol groups; and $R^4$ is an alkyl, alkoxy, nitro, nitrile, halogen, acyl or thiol group; and POM is a $[Mo_8O_{26}]^{4-}$ cluster or a $[W_8O_{26}]^{4-}$ cluster.

9. The compound of claim 8, wherein the POM is a $[Mo_8O_{26}]^{4-}$ cluster.

10. The compound of claim 8, wherein A is a 1-hexylammonium ion and B is a 1-hexyl, 2-pentyl, 4-,6-dimethyl pyridinium ion.

11. The compound of claim 8, wherein the compound exhibits a $PL_{max}$ of between about 400 and about 435 nm.

12. The compound of claim 9, wherein A is a 1-hexylammonium ion and B is a 1-hexyl, 2-pentyl, 4-,6-dimethyl pyridinium ion.

13. The compound of claim 12, wherein the compound exhibits a photoluminescence quantum yield (PLQY) of up to 92%.

14. The compound of claim 9, wherein B is an N-hexyl-2,4,6-trimethylpyridinium ion.

15. The compound of claim 9, wherein B is a 1,2,4,6-tetramethylpyridinium ion.

16. The compound of claim 8, wherein the POM is a $[W_8O_{26}]^{4-}$ cluster.

17. The compound of claim 16 wherein B is an N-hexyl-2,4,6-trimethylpyridinium ion.

18. The compound of claim 16, wherein B is a 1,2,4,6-tetramethylpyridinium ion.

* * * * *